(12) United States Patent
Huang et al.

(10) Patent No.: US 10,965,870 B2
(45) Date of Patent: Mar. 30, 2021

(54) IMAGE CAPTURING MODULE HAVING MULTIPLE LENSES

(71) Applicant: PowerGate Optical Inc., Zhubei (TW)

(72) Inventors: Ying Chun Huang, Hsinchu (TW); Yu Chia Chen, Hsinchu (TW); Hsieh Jen Chuang, Hsinchu (TW); Te Pao Ho, Hsinchu (TW); Shih Chan Wen, Hsinchu (TW)

(73) Assignee: PowerGate Optical Inc., Zhubei (TW)

( * ) Notice: Subject to any disclaimer, the term of this patent is extended or adjusted under 35 U.S.C. 154(b) by 0 days.

(21) Appl. No.: 16/825,543

(22) Filed: Mar. 20, 2020

(65) Prior Publication Data
US 2020/0221029 A1    Jul. 9, 2020

Related U.S. Application Data

(63) Continuation of application No. 15/998,458, filed on Aug. 15, 2018, now Pat. No. 10,638,043.

(51) Int. Cl.
| H04N 5/232 | (2006.01) |
| G02B 27/64 | (2006.01) |
| H04N 5/225 | (2006.01) |
| H04N 13/239 | (2018.01) |
| G02B 9/04 | (2006.01) |
| G02B 7/09 | (2021.01) |
| G02B 7/10 | (2021.01) |
| G02B 13/00 | (2006.01) |

(52) U.S. Cl.
CPC ........... *H04N 5/23248* (2013.01); *G02B 7/09* (2013.01); *G02B 7/102* (2013.01); *G02B 9/04* (2013.01); *G02B 13/003* (2013.01); *G02B 27/646* (2013.01); *H04N 5/2257* (2013.01); *H04N 5/23212* (2013.01); *H04N 5/23287* (2013.01); *H04N 13/239* (2018.05)

(58) Field of Classification Search
CPC ........... H04N 5/23248; H04N 5/23287; H04N 5/2257; H04N 13/239; H04N 5/23212; H04N 5/2251; H04N 5/2254; H04N 5/2258; G02B 27/646; G02B 9/04; G02B 7/09; G02B 7/102; G02B 13/003
See application file for complete search history.

(56) References Cited

U.S. PATENT DOCUMENTS

| 10,638,043 B2 * | 4/2020 | Huang ................. H04N 5/2257 |
| 2017/0336699 A1 * | 11/2017 | Hu ........................... G02B 7/09 |
| 2018/0067379 A1 * | 3/2018 | Rho ...................... H04N 5/2254 |

* cited by examiner

*Primary Examiner* — Albert H Cutler

(57) ABSTRACT

An image capturing module having multiple lenses, in which primary driving magnets of auto-focus module equipped in a first lens module and a second lens module will not cover an adjacent surface located between these two lens modules in the same time. A relatively smaller magnet is used to be the auxiliary driving magnet of optical image stabilization (OIS) module equipped in the first lens module and the second lens module. By using the aforementioned configuration of the primary and auxiliary driving magnets, interference of magnetic fields is minimized, and thus the distance between the first and second lens modules can be decreased, and the space of mobile phone having the image capturing module is saved. Moreover, such configuration can be used on the image capturing module having many lens modules.

20 Claims, 41 Drawing Sheets

FIG.7J 
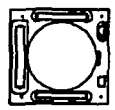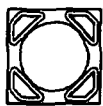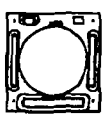 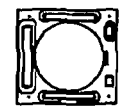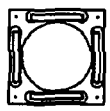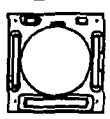
FIG.7K  FIG.7L C-C Section E-E Section

IMAGE CAPTURING MODULE HAVING MULTIPLE LENSES

BACKGROUND OF INVENTION

1. Field of the Invention

The invention refers to an image capturing module, and more particularly to an image capturing module having multiple lenses, tri-axial close-loop control and optical image stabilization system.

2. Description of the Prior Art

High quality image is one of the important concerns when choosing a smart phone or tablet with camera function. Smart phone with dual lens modules can provide better image capturing results. The difference between the images captured by these two lens modules must be as tiny as possible such that the system can overlay the images precisely; therefore, the two lens modules must be located as near as possible, in order to obtain the best result of integrated image. Of course, when combining two images captured by two lens modules, better result in depth of field can also be acquired, so as to capture fast-moving objects in a more stabilized manner. However, when using the lens module of smart phone to take photos, minor shakings of smart phone will make the lens tilts, causing the observation angle of lens module varies, resulting in the imaging position on the image sensor to offset from its original position, and thus causing the captured image to blur. Blurry images definitely are deficiencies and quality losses for combined images of two lens modules. In order to overcome such problem, multiple lenses with optical image stabilization (OIS) system are the basic requirements of an image capturing module of smart phone.

In order to achieve the functions of OIS and rapid auto-focusing (AF), the problem of magnetic interference must be resolved. Traditional design of auto-focusing (AF) and/or optical image stabilization (OIS) lens modules has very poor ability to prevent the magnetic interference, therefore, the two lens modules must be displaced from each other for a significant distance to provide normal functions, and thus is inadequate to suit the needs of design for novel smart phones.

SUMMARY OF THE INVENTION

The primary objective of the present invention is to provide an image capturing module having multiple lenses, which can minimize the magnetic interference between neighboring lens modules with limited distance, and ensure sufficient horizontal driving forces can be generated by the optical image stabilization (OIS) module, such that multiple lenses of the image capturing module can capture images in a more precise manner, and that the goal to obtain better integrated effect of captured images can be achieved.

In order to achieve the aforesaid objective, the present invention provides an image capturing module having multiple lenses comprising at least a first lens module and a second lens module neighboring the first lens module; the first lens module and the second lens module each being defined by an X-axis, a Y-axis and a Z-axis that are perpendicular to each other; the first lens module and the second lens module each having an optical axis parallel to the Z-axis; the first lens module and the second lens module each comprising:

a frame, having an inner compartment therein;

a lens set, located in the compartment of the frame in a moveable manner;

at least one elastic element, connecting with the frame, said at least one elastic element supporting and retaining the lens set in a manner movable along the optical axis inside the compartment; and a first driving system, further comprising: a driving coil and at least two primary driving magnets opposite to each other; wherein the driving coil is furnished on outer peripheral of the lens set and is corresponding to the at least two primary driving magnets inside the frame for providing a magnetic driving force to drive the lens set to move along the optical axis;

wherein, at least one of the first lens module and the second lens module further comprises:

a second driving system, comprising: a circuit board, at least two horizontal coils and at least two auxiliary driving magnets; said at least two auxiliary driving magnets being located on the frame; said at least two horizontal coils being furnished on the circuit board and being corresponding to said primary driving magnets and said at least two auxiliary driving magnets for providing another magnetic driving force to drive the frame to move along the X-axis and the Y-axis; and a plurality of suspension wires for supporting and suspending the frame together with the lens and the at least one elastic element above the circuit board; wherein, the first lens module and the second lens module are adjacent to each other and have an adjacent surface located therebetween, in addition, the primary driving magnets of the first lens module and the second lens module are not located at the side adjacent to the adjacent surface at the same time; wherein said auxiliary driving magnet has a volume smaller than the volume of said primary driving magnet.

In a preferred embodiment, the first lens set and the second lens set each further comprises a top cover, the top cover has a hole; in addition, the lens set further comprises: lenses and a lens support; wherein the lenses are mounted in and moveable together with the lens support; wherein, the image capturing module having multiple lenses further comprises:

an external circuit, located below the frame and electrically connected with the circuit board; said external circuit being mounted with an image sensor and at least one position sensor; and at least one sensing magnet, mounted at a side of outer surface of said lens set, and corresponding to one of said at least one position sensor.

In a preferred embodiment, at least one of the first lens module and the second lens module further has a notch side; here the term "notch side" means that, a top view of the first lens module (or the second lens module) has a square contour including four sides; in which, among these four sides, there is one of said four sides being equipped with no primary driving magnet nor relatively larger auxiliary driving magnet and being called as the notch side of the first lens module (or the second lens module).

In a preferred embodiment, said at least one auxiliary driving magnet further comprises: a larger first auxiliary driving magnet, a smaller second auxiliary driving magnet and a smaller third auxiliary driving magnet; wherein, the second auxiliary driving magnet and the third auxiliary driving magnet are located at the notch side adjacent to the adjacent surface, and the volumes of the second auxiliary driving magnet and the third auxiliary driving magnet are both smaller than the volume of the first auxiliary driving magnet, and the volume of the first auxiliary driving magnet is smaller than the volume of the primary driving magnet; wherein the second auxiliary driving magnet and the third auxiliary driving magnet both are a unipolar magnet or a bipolar magnet; wherein a magnetization direction of both the second auxiliary driving magnet and the third auxiliary driving magnet is one of the following: radial magnetization direction, circumferential magnetization direction, or the magnetization direction of the second auxiliary driving magnet is facing to the magnetization direction of the third auxiliary driving magnet.

In a preferred embodiment, the first auxiliary driving magnet is either unipolar or bipolar magnet with either radial magnetization direction or axial magnetization direction, in addition, the polarity of the first auxiliary driving magnet is either the same with or different from the polarity of at least a lower part of the primary driving magnet.

In a preferred embodiment, the at least one auxiliary driving magnet further comprises: a relatively larger first auxiliary driving magnet and a relative smaller second auxiliary driving magnet; the second auxiliary driving magnet is located nearby the adjacent surface, and the volume of the second auxiliary driving magnet is smaller than or equal to ⅔ of the volume of the first auxiliary driving magnet; the volume of the first auxiliary driving magnet is smaller than the volume of the primary driving magnet.

In a preferred embodiment, the heights of the primary driving magnet and the auxiliary driving magnet are higher than a bottom edge of the driving coil along the Z-axis, and the heights of the primary driving magnet and the auxiliary driving magnet are different.

In a preferred embodiment, the height of the first auxiliary driving magnet is lower than the heights of the second auxiliary driving magnet and the third auxiliary driving magnet located nearby the adjacent surface; in addition, the height of the first auxiliary driving magnet is also lower than the height of the primary driving magnet.

In a preferred embodiment, the heights of the second auxiliary driving magnet and the third auxiliary driving magnet are not higher than the height of the primary driving magnet.

In a preferred embodiment, the lengths of the second auxiliary driving magnet and the third auxiliary driving magnet are both not longer than ⅓ of the length of the first auxiliary driving magnet; in addition, the thicknesses of the second auxiliary driving magnet and the third auxiliary driving magnet are either the same with or different from the thickness of the first auxiliary driving magnet.

In a preferred embodiment, the primary driving magnet is a bipolar magnet with radial magnetization direction.

In a preferred embodiment, said at least one elastic element includes an upper spring and a lower spring, which are respectively connected to a top end and a bottom end of the frame.

In a preferred embodiment, the circuit board is electrically connected with a connecting plate with a circuit layout, and is further electrically connected with the external circuit by means of a plurality of contact pins located on a side of the connecting plate; wherein, the image sensor is located at the optical axis and is capable of accepting an external image light coming from the lens set and the hole of top cover; wherein the external circuit is a circuit of one of the following: smart phone, tablet computer or notebook computer; wherein the position sensor is one of the following: Hall sensor, AMR, GMR or TMR; wherein the driving coil is one of the following: annular unipolar driving coil, annular bipolar driving coil, bipolar flat coil or a PCB; wherein the number of the suspension wires is four.

In a preferred embodiment, an upper part of the primary driving magnet co-works with the driving coil to provide magnetic driving forces along Z-axis; a lower part of the primary driving magnet co-works with the horizontal coil to provide magnetic driving forces along either X-axis or Y-axis.

In a preferred embodiment, the sensing magnet is either a unipolar sensing magnet or a bipolar sensing magnet.

In a preferred embodiment, a magnetization direction of the sensing magnet is parallel to the optical axis, that is parallel to the Z-axis.

In a preferred embodiment, the distance between a center point along the length of the primary driving magnet of the first lens module and a center point of the spacing between the first and second lens modules is either the same with or different from a distance between the center point along the length of the primary driving magnet of the second lens module 22 and the center point of the spacing between the first and second lens modules.

In a preferred embodiment, the configuration of the primary and auxiliary driving magnets is either four corner-typed magnets located at four corners of the frame or four rectangular bar-typed magnets located at four sides of the frame.

In a preferred embodiment, the height of the first auxiliary driving magnet is lower than at least one of the second auxiliary driving magnet or the third auxiliary driving magnet, in addition, the height of the first auxiliary driving magnet is lower than the primary driving magnet.

In a preferred embodiment, the primary driving magnet is unipolar magnet with radial magnetization direction.

All these objects are achieved by the distributed feedback laser structure and the fabricating method thereof described below.

BRIEF DESCRIPTION OF THE DRAWINGS

As shown in FIG. 7A.

FIG. 7E to FIG. 7L are schematic views of various embodiments of the second preferred embodiment of the image capturing module having multiple lenses in accordance with the present invention.

DESCRIPTION OF THE PREFERRED EMBODIMENT

The structure of a lens module with optical image stabilization (OIS) system usually comprises either four corner-typed magnets or four rectangular bar-typed magnets mounted in a supporting frame which is suspended above a substrate by using four suspension wires. For an image capturing module having multiple lenses, because the distance between two neighboring lens modules is so small, magnetic interference is very likely to happen due to the magnets inside the two neighboring lens modules, and thus the problems of tilts and offsets of optic axis occur.

Figure 14B:
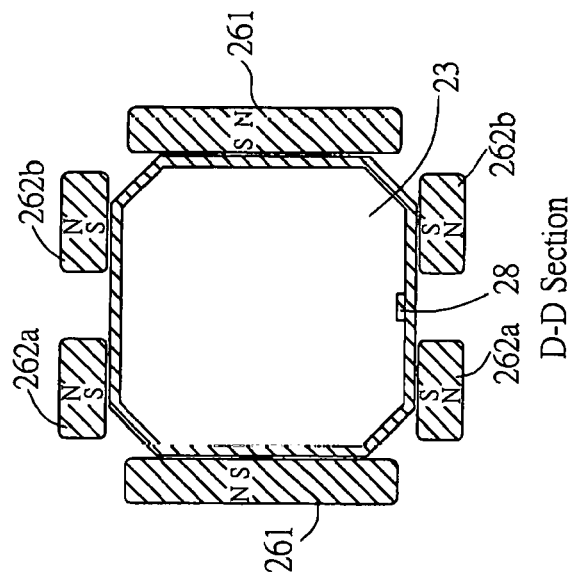
FIG. 14A and FIG. 14B respectively are the schematic side view and D-D sectional view of an embodiment of the driving system of the image capturing module with OIS system designed by the inventors of the invention.
Figure 14A:
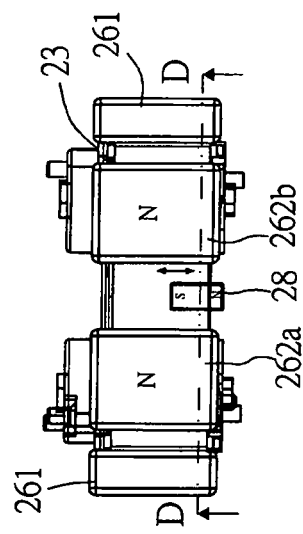

Please refer to FIG. 14A and FIG. 14B, which respectively are the schematic side view and D-D sectional view of an embodiment of the driving system of the image capturing module with OIS system designed by the inventors of the invention. As shown in FIG. 14A and FIG. 14B, the embodiment of image capturing module designed by the inventors of the invention comprises a moving coil closed loop auto-focusing driving module, in which, the rectangular bar-typed magnets located at two opposite sides of the driving module are divided to two separated driving magnets 262a, 262b. The sensing magnet 28 is located at middle between the two separated driving magnets 262a, 262b of the lens set 23 to avoid magnetic interference. The driving magnets 261,262a,262b of the moving coil closed loop auto-focusing driving module include undivided rectangular bar-typed driving magnets 261 and divided smaller separated driving magnets 262a, 262b. All these driving magnets 261,262a,262b cooperatively working with the coils (including an Z-axial coil wound around the outer rim of the lens set 23 and horizontal coils located on the circuit board under the lens set 23) to perform driving functions along the Z-axis and horizontal directions along X-axis and Y-axis, which means, all these driving magnets 261,262a,262b are shared by the auto-focusing (AF) module and the optical image stabilization (OIS) module.

Figure 15:
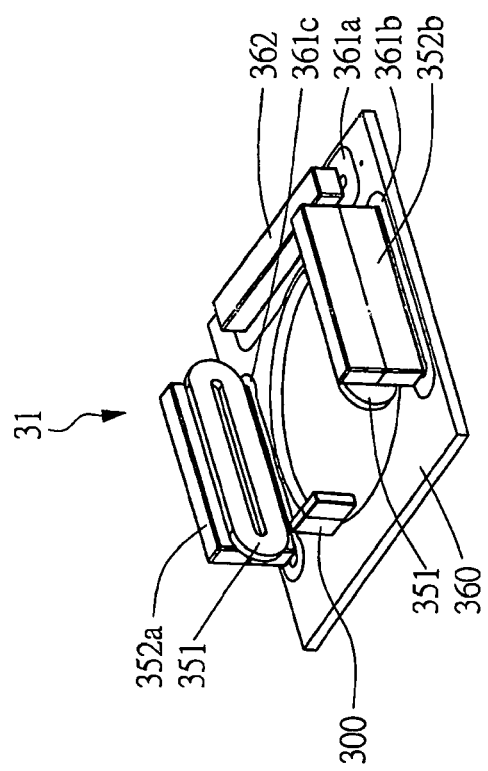
FIG. 15 is a schematic perspective view of another embodiment of the driving system of the image capturing module with OIS system designed by the inventors of the invention.

Please refer to FIG. 15, which is a schematic perspective view of another embodiment of the driving system of the image capturing module with OIS system designed by the inventors of the invention. As shown in FIG. 15, the embodiment of image capturing module designed by the inventors of the invention comprises a moving coil closed loop auto-focusing driving module, which has a magnetic interference avoiding structure that includes primary and auxiliary driving magnets 352a,352b,362 located at three sides of the lens module 31, while the other side is a notch side without any driving magnet. The notch side of the lens module 31 is located adjacent to the adjacent surface of another neighboring lens module (not shown in this figure). The sensing magnet 300 is located at the notch side and is mounted on the lens set for providing feedback magnetic field for closed loop control of Z-axial positions for AF. The vertical driving forces along the Z-axis are provided by two opposite primary driving magnets 352a, 352b and their cooperative plane coils 351. In the meantime, the two opposite primary driving magnets 352a, 352b also co-work with horizontal coils 361c, 361b to provide horizontal driving forces along the Y-axis. The auxiliary driving magnet 362 is located at a side between the two primary driving magnets 352a, 352b and has a volume smaller than the primary driving magnets 352a, 352b. The auxiliary driving magnet 362 co-works with the horizontal coil 361a to provide horizontal driving forces along the X-axis. The primary and auxiliary driving magnets 352a, 352b, 362 located at three sides of lens module 31 co-work with the horizontal coils 361c, 361b, 361a furnished on the circuit board 360 below to generate horizontal driving forces. In order to provide closed loop control functions of OIS, additional spaces must be provided by redesigning the horizontal coils 361c, 361b, 361a in order to accommodate the X-axis sensor and Y-axis sensor mounted on the external circuit, so as to avoid the magnetic field generated by the horizontal coils 361c, 361b, 361a. Therefore, the horizontal coils 361c, 361b, 361a have to be either divided into multiple smaller coils or designed with smaller area. As a result, the only one auxiliary driving magnet 362 will co-work with an even smaller sized horizontal coil 361a due to the design of closed loop control along, the X-axis, and thus the horizontal driving force along the X-axis will be even inadequate.

The present invention uses the space at the notch side adjacent to the adjacent surface to furnish two smaller auxiliary driving magnets for providing magnet fields for closed loop control and horizontal driving forces along the X-axis and/or Y-axis. Such that, the image capturing module having multiple lens of the present invention not only can avoid magnetic interference between neighboring lens modules, but also provide tri-axial close-loop control function and optical image stabilization (OIS) system with the best horizontal driving forces. The embodiments of the first lens module 21 and second, lens module 22 shown in the figures and illustrated hereinafter are only for demonstration purposes, and cannot be used to limit to the order and positions of the multiple lenses. In order to illustrate how does the magnet interference between two adjacent lens modules with OIS influence the optical axis, the following figures and their corresponding descriptions are illustrated.

Figure 1:
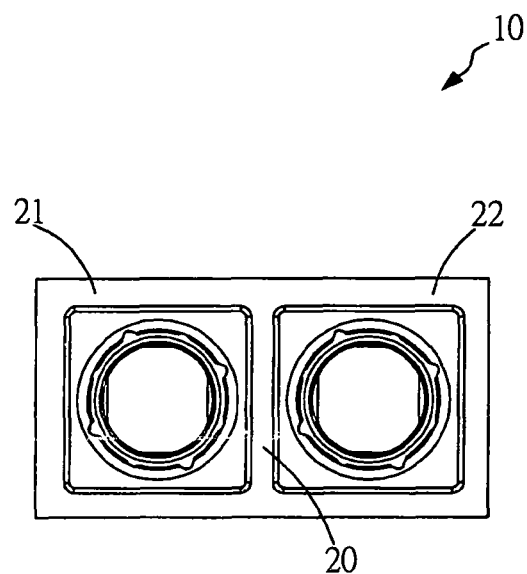
FIG. 1 is a schematic top view of the image capturing module with multiple lenses in accordance with the present invention, taking dual lens modules as an example.

Please refer to FIG. 1, which is a schematic top view of the image capturing module with multiple lenses in accordance with the present invention, taking dual lens modules as an example. As shown in FIG. 1, the image capturing module 10 of the present invention, taking dual lens modules as an example, comprises a first lens module 21 and a second lens module 22. The first and second lens modules 21,22 are adjacent to each other and have an adjacent surface 20 located therebetween.

Figure 2A:
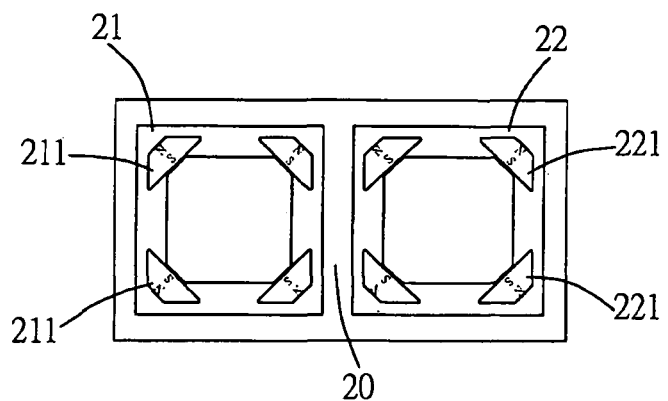
FIG. 2A is a schematic top view showing an embodiment of the dual lens modules shown in FIG. 1 having driving magnets furnished at four corners of each lens module.
Figure 2B:
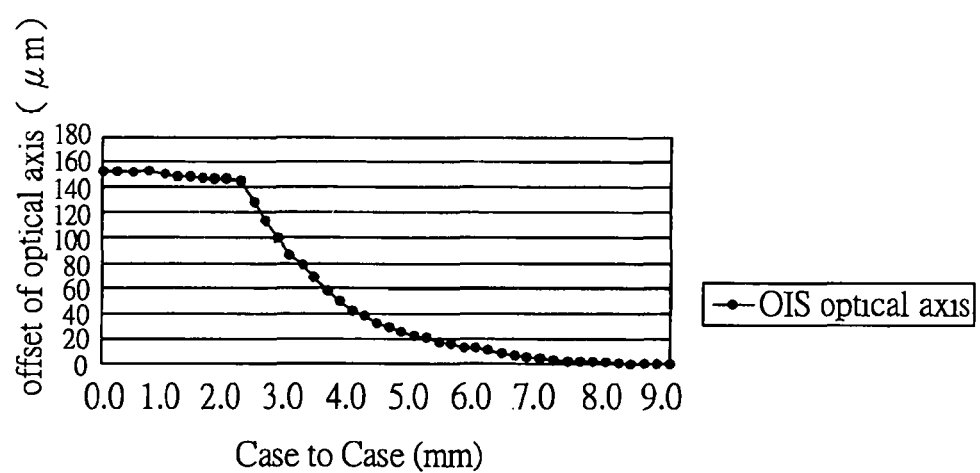
FIG. 2B is a diagram showing a test result of the offset of optical axis influenced by the magnetic interference caused by the four corner-typed driving magnets of the dual lens modules shown in FIG. 2A.

Please refer to FIGS. 2A and 2B, in which, FIG. 2A is a schematic top view showing an embodiment of the dual lens modules shown in FIG. 1 having driving magnets furnished at four corners of each lens module. FIG. 2B is a diagram showing a test result of the offset of optical axis influenced by the magnetic interference caused by the four corner-typed driving magnets of the dual lens modules shown in FIG. 2A. As shown in FIG. 2A, each of the first and second lens modules 21, 22 is equipped with four driving magnets 211,221 at four corners thereof. From the test result shown in FIG. 2B, it is understood that, when these two lens modules 21, 22 are getting close to each other (i.e., when the distance between the other cases of these two lens modules 21, 22 is decreasing), the offset distance of optical axis will increase significantly. When the distance between the other cases of these two lens modules 21, 22 comes to 2.0 mm, the offset of optical axis becomes as large as 147 μm which has already caused the interference due to limited space of the driving module.

Figure 3A:
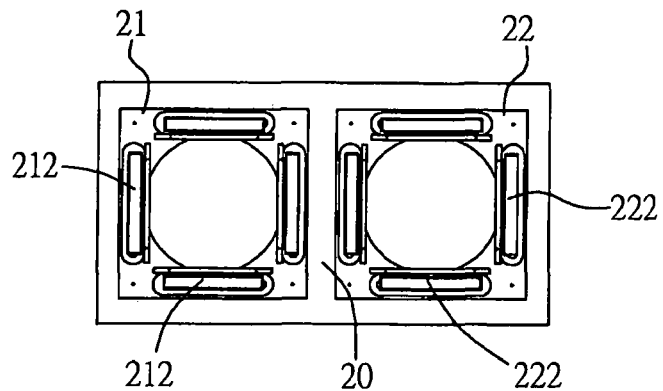
FIG. 3A is a schematic top view showing an embodiment of the dual lens modules shown in FIG. 1 having bar-typed driving magnets furnished at four sides of each lens module.
Figure 3B:
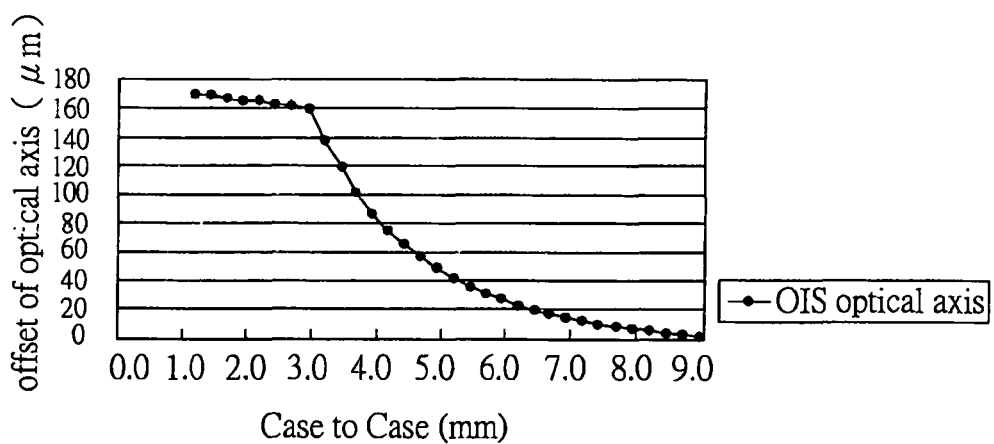
FIG. 3B is a diagram showing a test result of the offset of optical axis influenced by the magnetic interference caused by the four bar-typed driving magnets of the dual lens modules shown in FIG. 3A.

Please refer to FIG. 3A and FIG. 3B. FIG. 3A is schematic top view showing an embodiment of the dual lens modules shown in FIG. 1 having bar-typed driving magnets furnished at four sides of each lens module. FIG. 3B is a diagram showing a test result of the offset of optical axis influenced by the magnetic interference caused by the four bar-typed driving magnets of the dual lens modules shown in FIG. 3A. As shown in FIG. 3A, each of the first and second lens modules 21, 22 is equipped with four rectangular bar-typed driving magnets 212,222 at four sides thereof. By using the same testing method as which illustrated in FIG. 2B to test the dual lens modules having bar-typed driving magnets shown in FIG. 3A, the test result as shown in FIG. 3B is obtained. From the test result shown in FIG. 3B, it is understood that, when these two lens modules 21, 22 are getting close to each other (i.e., when the distance between the other cases of these two lens modules 21, 22 is decreasing), the offset distance of optical axis will increase significantly. When the distance between the other cases of these two lens modules 21, 22 comes to 3.0 mm, the offset of optical axis becomes as large as 159 μm which has already caused the interference due to limited space of the driving module.

Please refer to FIGS. 4A to 4D, which respectively are the three-dimensional exploded view, the top view, the A-A sectional view and the B-B sectional view of an embodiment of a fundamental structure of the first lens module of the image capturing module of the present invention.

The image capturing module 10 of the present invention comprises at least a first lens module 21 and a second lens module 22. The first and second lens modules 21,22 are adjacent to each other and have an adjacent surface 20 located therebetween. Each of the first and second lens modules 21,22 has an optical axis 9 and is defined with an X-axis, a Y-axis and a Z-axis perpendicular with each other. The optical axis 9 is parallel to the Z-axis. In this embodiment, the structures of the first and second lens modules 21,22 are exactly the same, and thus only one of them will be illustrated in detail hereunder.

According to the image capturing module 10 having multiple lenses of the present invention, the first second lens module 21 comprises: a top cover 11, a frame 100, a lens set 13, at least one elastic element 14, a first driving system (also referred as AF system) 15, a second driving system (also referred as OIS system) 16, a plurality of suspension wires 17, an external circuit (also referred as external substrate) 12 and at least one sensing magnet 18. The at least one elastic element 14 further comprises: an upper spring 141 and a lower spring 142. The first driving system 15 comprises: a driving coil 151 and a pair of primary driving magnets 152a, 152b located opposite to each other.

The first driving system comprises: a driving coil 151 and two opposite primary driving magnets 152a, 152b corresponding to the driving coil 151. The second driving system 16 comprises: a circuit board 160, a plurality of horizontal circuits 161a,161b,161c,161d and a plurality of auxiliary driving magnets 162a, 162b,162c.

The cover 11 has a through hole 111. The frame 100 is a hollow supporting frame which is received in the cover 11 in such a manner that, the frame 100 is movable horizontally relative to the cover 11. In addition, the frame 11 has an inner compartment 101. The lens set 13 is received inside the compartment 101, suspended by the elastic element 14, located at the optical axis 9, and movable along the optical axis 9 relative to the frame 100. External light can pass through the hole 111 of cover 11, enter the lens set 13 along the optical axis 9, and be focused on the image sensor 121 by means of the lens set 13.

The lens set 13 further includes: a set of lenses 131 and a lens support 132. In which, the optical axis 9 is the focusing axis of the lenses 131 which are located and fixed at a middle of the lens support 132. The top and bottom ends of the lens support 132 further includes a plurality of bulges 1321 for mating the corresponding pin holes formed on inner rims of the upper spring 141 and lower spring 142 of the elastic element 14, such that, the lens support 132 can be supported and suspended inside the compartment 101 of the frame 100 by means of inner rims of the springs 141, 142.

The upper spring 141 and lower spring 142 of the elastic element 14 are respectively fixed on outer rims of a top end 102 and a bottom end 103 of the frame 100, and are flexibly maintaining the lens set 13 inside the compartment 101 of the frame 100 in such a manner that, the lens set 13 is movable along the optical axis 9 but will not drop out from the frame 100.

In a preferred embodiment, the upper spring 141 and lower spring 142 are made of metal and each is formed as a hollow sheet-like spring by means of mechanical stamping or etching manufacturing processes. The upper and lower springs 141,142 are respectively formed with four positioning points 1411,1421 at out rim thereof, such that, these positioning points 1411,1421 can respectively mate with the fixing posts 104 formed on the top end 102 and bottom end 103 of the frame 100, and, as a result, the lens set 13 can be elastically suspended and limited within the compartment 101 of the frame 100 in a manner movable along the optical axis 9.

The first driving system 15 (also referred as AF system) comprises: at least one driving coil 151 and two primary driving magnets 152a,152b located opposite to each other. In the preferred embodiment, the driving coil 151 is am annular unipolar coil wound around the outer circumference of the lens support 132. The two opposite primary driving magnets 152a,152b are bipolar magnets with radial magnetization direction. The two primary driving magnets 152a, 152b both has an upper part and a lower part. The upper parts of primary driving magnets 152a,152b are belong to the first driving system 15 for co-working with the driving coil 151 for providing vertical driving forces (i.e., along Z-axis). The lower parts of primary driving magnets 152a, 152b are belong to the second driving system 16, which are closing to and co-working with the horizontal coils 161b, 161c for providing a first horizontal (sideward) driving force (i.e., either along X-axis or Y-axis).

The second driving system 16 (also referred as OIS system) comprises: a circuit board 160, a plurality of horizontal coils 161a,161b,161c,161d and a plurality of auxiliary driving magnets 162a,162b,162c. The horizontal coils 161a,161b,161c,161d are furnished on the circuit board 160 by means of printed circuitry technologies. The auxiliary driving magnets 162a,162b,162c and the horizontal coils 161a,161b,161c,161d are belong to the second driving system 16 and are co-working for providing a second horizontal driving force (i.e., either along X-axis or Y-axis) perpendicular to the first horizontal driving force. The magnetization directions of these auxiliary driving magnets 162a, 162b,162c are all radial. A sensing magnet 18 is positioned at a notch part between the two smaller auxiliary driving magnets 162b,162c for co-working with a sensor positioned on the external circuit for providing closed-loop control function along the Z-axis direction. The magnetization direction of the sensing magnet 18 is parallel to the optical axis, that is, parallel to the Z-axis.

The plurality of suspension wires 17 provide the functions of elastic suspension and electric transmission/conduction. The suspension wires 17 support and suspend the frame 100 together with the lens set 13, elastic element 14, driving coil 151 wound around the lens support 132 and the primary and auxiliary driving magnets 152a,152b,162a,162b,162c mounted on an inner-surface of the frame 100 right above the circuit board 160. In this embodiment, the number of suspension wires 17 is four.

The circuit board 160 is electrically connected with a connecting plate 19 having a circuit layout 191, and further electrically connected with the external circuit 12 via the contact pins 192 located on a side of the connecting plate 19. The external circuit 12 further comprises: an image sensor 121 and a plurality of position sensors 122a,122b,122c. The image sensor 121 is located at the optical axis 9 and is able to accept image light coming from outside via the lens set 13 and the hole 111 of top cover 11, so as to transform the received image light into electric signals which can be handled by computers. In this embodiment, the external circuit 12 can be a circuit of a smart phone, a tablet computer or a notebook computer.

In the present invention, the position sensors 122a,122b, 122c are mounted on a top surface of one of the following: the circuit board 160, the connecting plate 19 or the external circuit 12 (e.g., external substrate), and are located respectively corresponding to and right below the primary driving magnet 152b, the auxiliary driving magnet 162b and the sensing magnet 18, in order to detect the variations of magnetic fields of the primary driving magnet 152b, the auxiliary driving magnet 162b and the sensing magnet 18, and to calculate the positional variations of the lens support 132 relative to the circuit board 160 along the X-axis, Y-axis and Z-axis. The image sensor 121 mounted on the top surface of external circuit (e.g., external substrate) is for receiving and transforming the image light coming from the lens set 13 into electric signals which can be handled by computers.

The sensing magnet 18 is mounted on the lens support 132 of lens set 13 of the image capturing module with tri-axial closed-loop control and OIS functions. The magnetization direction of the sensing magnet 18 is parallel to the optical axis 9 (Z-axis). In the present invention, the sensing magnet 18 can be either a unipolar sensing magnet or a bipolar sensing magnet.

In other words, the lens set 13 is mounted inside the lens support 132, and the driving coil 151 is wounded around the outer circumference of the lens support 132. The top and bottom ends of the lens support 132 are furnished with the upper and lower springs 141, 142 respectively in order to support and suspend the lens support 132 together with the lens set 13 inside the frame 100. When applying electricity to the driving coil 151, magnetic field generated by the driving coil 151 will incur pushing or pulling forces against the magnetic fields of upper parts of the primary driving magnets 152a,152b, so as to drive the lens support 132 together with the lens set 13 to move along the Z-axis inside the frame 100. The frame 100 is suspended above the circuit board 160 by means of the four suspension wires 17 fixed at four corners of the frame 100. When applying electricity to one or some of the horizontal coils 161a,161b,161c,161d, magnetic fields generated by the horizontal coils 161a,161b, 161c,161d will incur pushing or pulling forces against the magnetic fields of lower parts of the primary driving magnets 152a,152b or the auxiliary driving magnets 162a,162b, 162c, so as to drive the frame 100 together with the lens support 132 and the lens set 13 to move horizontally along the X-axis or/and the Y-axis.

Taking image capturing module having multiple lenses as an example, two neighboring lens modules includes a first lens module and a second lens module. At least one of these two lens modules comprises a driving system which includes at least three driving magnets located on three sides of the lens module, and the other one side of the lens module is a notch side without driving magnet. Here the term "notch side" means that, a top view of the first lens module (or the second lens module) has a square contour including four sides; in which, among these four sides, there are three sides being equipped with either a primary driving magnet or larger auxiliary driving magnet, and the rest one side isn't. That side equipped with no primary driving magnet nor larger auxiliary driving magnet is called as the "notch side" of the first lens module (or the second lens module). The first lens module is adjacent to the second lens module in such a manner that, an adjacent surface is defined between the first and second lens modules. The notch side (ps. without any primary driving magnet nor larger auxiliary driving magnet) of the first lens module is located on and oriented toward the adjacent surface. Therefore, no matter which side of the second lens module is facing toward the adjacent surface, the primary driving magnets or larger auxiliary driving magnets of the first lens module and the second lens module will not exist at the side adjacent to the adjacent surface at the same time, such that magnetic interference thereof can be minimized. It is noted that, the drawings and descriptions of the first lens module and the second lens module are merely for describing some of the examples only, and cannot be used to limit the applicable order, position or structure of the multiple lens modules of the present invention.

Figure 5:
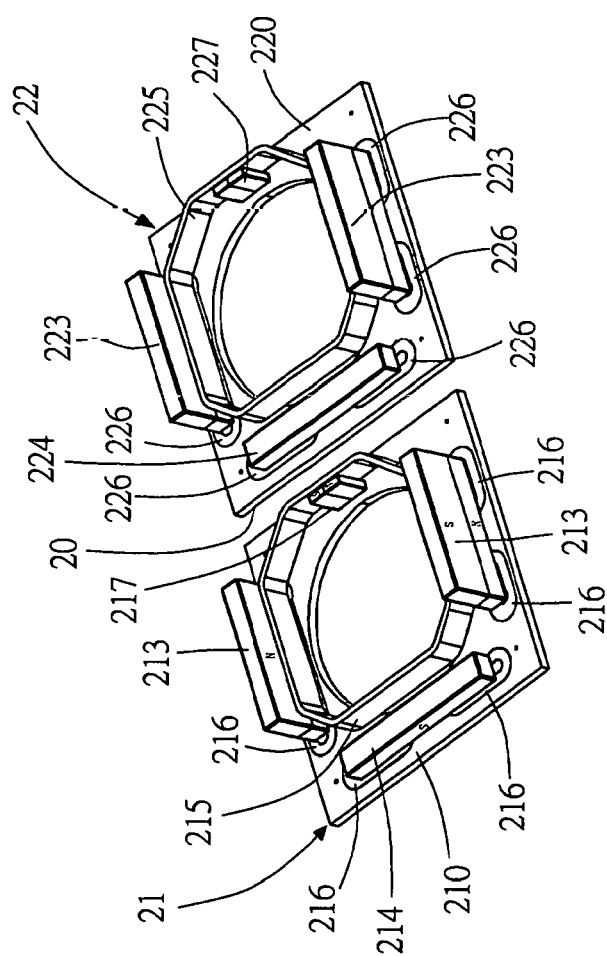
FIG. 5 is a perspective view showing an embodiment of a fundamental architecture of the driving system of OIS module of the image capturing module in accordance with the present invention capable of avoiding magnetic interference.

Please refer to FIG. 5, which is a perspective view showing an embodiment of a fundamental architecture of the driving system: of OIS module of the image capturing module in accordance with the present invention capable of avoiding magnetic interference. Wherein, the driving systems of the first and second lens modules 21,22 each comprises: two primary driving magnets 213,223, at least one auxiliary driving magnet 214,224, a driving circuit 215,225, a plurality of horizontal circuits 216,226 and a circuit board 210,220. In the following embodiments described below, the first lens module 21 and the second lens module 22 have substantially the same architecture of driving system, and thus only take the first lens module 21 as the example for illustration.

Taking the first lens module 21 as example, the primary driving magnets 213 and the auxiliary driving magnet 214 are mounted on the positioning slots formed on the inner surface of the frame. Only three sides of the first lens module 21 are equipped with either the primary driving magnet 213 or the auxiliary driving magnet 214, while the other one side is a notch side without any driving magnet. The primary driving magnets 213 and the auxiliary driving magnet 214 are all with radial magnetization direction. The polarity of the primary driving magnet 213 is bipolar N/S or S/N. The polarity of the auxiliary driving magnet 214 is opposite to the lower part of the primary driving magnet 213 S or N. Wherein, the height of the auxiliary driving magnet 214 is lower than the two primary driving magnets 213. The two primary driving magnets 213 are respectively located at two ends of the elongated auxiliary driving magnet 214 and are opposite to each other. The upper parts of the primary driving magnets 213 are corresponding to and co-work with the driving coil 215 for driving the lens set to move along the optical axis (Z-axis) and are belong to the first driving system. The lower parts of the primary driving magnets 213 and the auxiliary driving magnet 214 are corresponding to and co-work with the horizontal coils 216 for driving the frame together with the lens set to move along the X-axis and the Y-axis and are belong to the second driving system.

The driving coil 215 is wound around the outer circumference of the lens support of the lens set. The driving coil 215 is one of the following: an annular monopole coil, an annular bipolar coil, a flat-plate-typed bipolar coil or a printed circuit board (PCB). The second driving system is for adjusting error corrections of the horizontal positions of the lens set along the X-axis and the Y-axis. The second driving system comprises: a circuit board 210 furnished with at least one set of two X-axial horizontal coils 216 and at least one set of two Y-axial horizontal coils 216, a connecting plate, an X-axial position sensor and a Y-axial position sensor. In which, the set of two X-axial horizontal coils 216 are located opposite to each other, and the set of two Y-axial horizontal coils 216 are also located opposite to each other. Moreover, the X-axial horizontal coil and the Y-axial horizontal coil are located at neighboring sides of the first lens module. The X-axial position sensor is located at a side of the first lens module where the X-axial horizontal coil is located, while the Y-axial position sensor is located at a side where the Y-axial horizontal coil is located. The X-axial and Y-axial position sensors are both furnished on a top surface of the external circuit (please refer to FIG. 4A). The X-axial and Y-axial position sensors are respectively located corresponding to and right below a middle point of the primary driving magnet 213 and the auxiliary driving magnet 214. The circuit board 210 is electrically connected with the circuit layout of the connecting plate, and further electrically connected with the external circuit via the contact pins located on a side of the connecting plate.

The sensing magnets 217,227 are respectively furnished on a side of outer surface of lens set, and the magnetic line of magnetic force is parallel to the optical axis, such that, the magnetizing direction of each sensing magnet 217,227 is downward and align with the Z-axial position sensor on the external circuit. The sensing magnets 217,227 can be bipolar sensing magnets, which can be either symmetric magnetized or asymmetric magnetized. The position sensor can be one of the following: Hall sensor, AMR, GMR, or TMR.

Figure 4A:
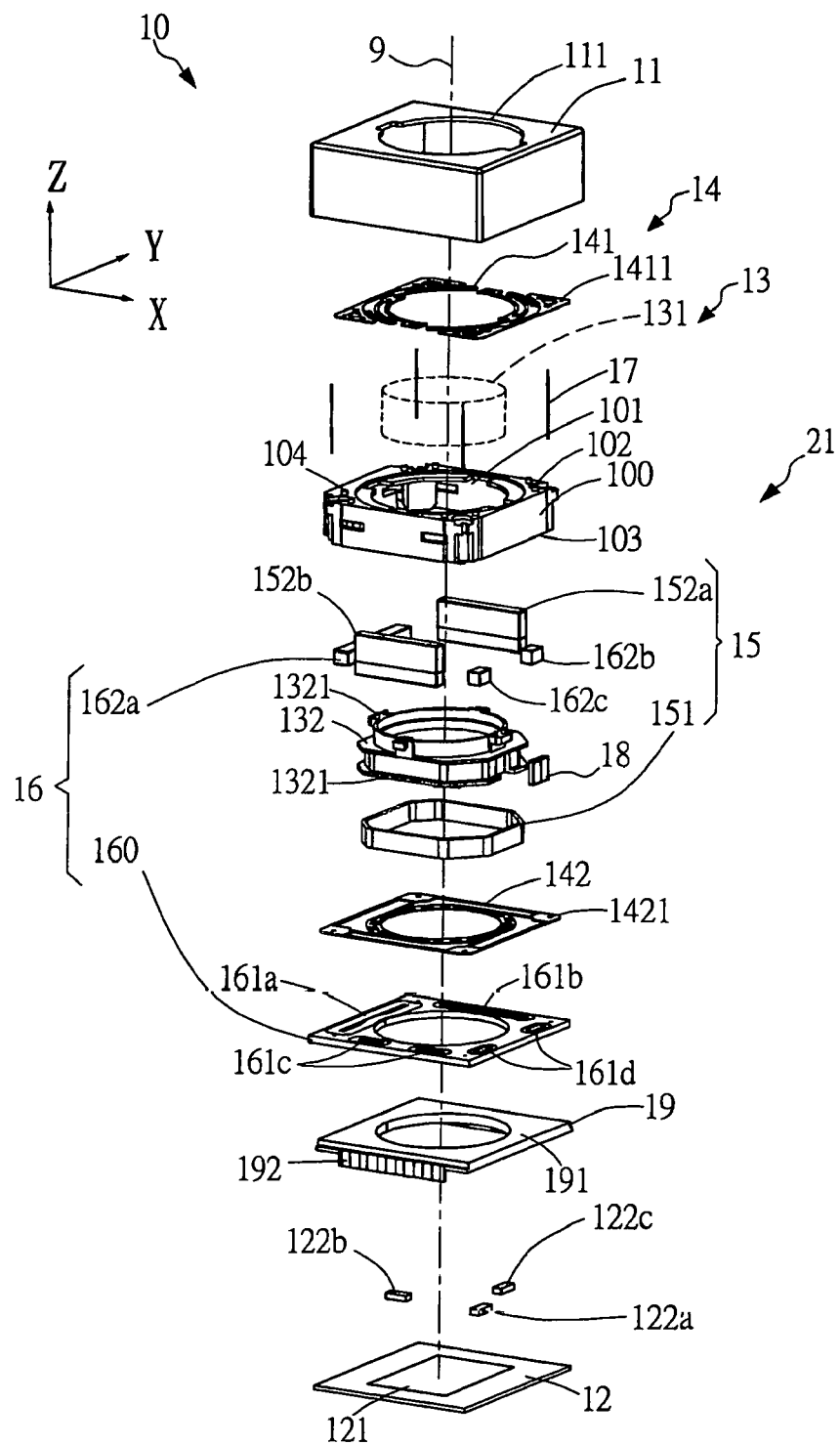
FIGS. 4A to 4D respectively are the three-dimensional exploded view, the top view, the A-A sectional view and the B-B sectional view of an embodiment of a fundamental structure of the first lens module of the image capturing module of the present invention.
Figure 4B:
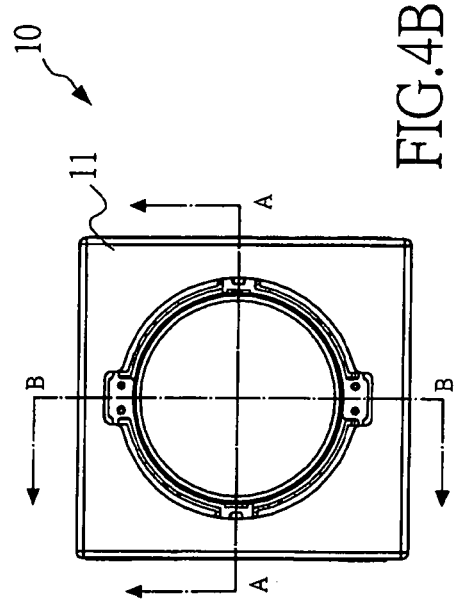
Figure 4D:
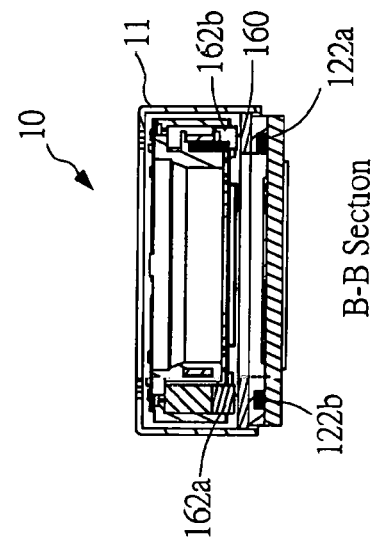
Figure 4C:
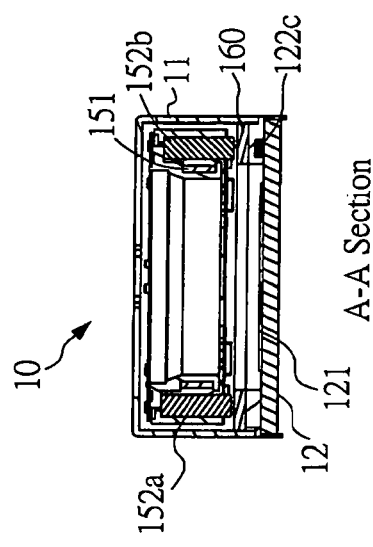
Figure 6A:
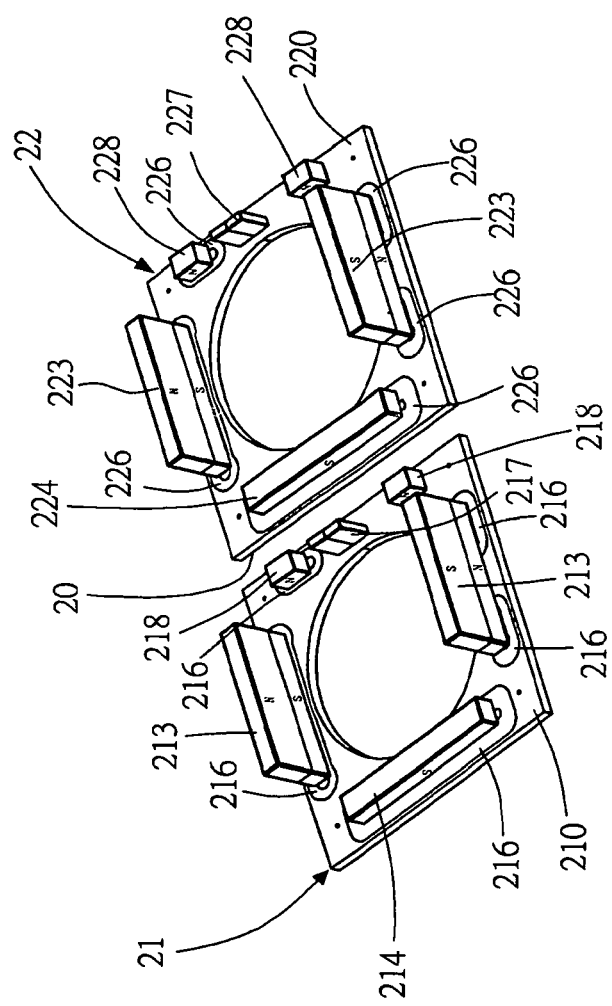
FIG. 6A is a schematic view of the first preferred embodiment of the image capturing module having multiple lenses in accordance with the present invention.

Please refer to FIG. 6A, which is a schematic view of the first preferred embodiment of the image capturing module having multiple lenses in accordance with the present invention. The same architecture of the driving system of OIS module of the image capturing module as which shown in FIG. 4A is used in this first preferred embodiment shown in FIG. 6A. Which means, the first and second lens module 21,22 of the first preferred embodiment shown in FIG. 6A both has the same structure as the one illustrated and shown in FIG. 4A. In addition, each one of the first and second lens module 21,22 respectively includes two smaller auxiliary driving magnets 218, 228 located at positions outer than the sensing magnet 217,227 and opposite to the first auxiliary driving magnet 214, 224 which is also called as the larger auxiliary driving magnet. Such arrangement and structure of image capturing module not only can significantly decrease the magnetic interference between these two adjacent lens module 21,22 because that at least one of the two lens module 21,22 will let its "notch side" to adjacent and facing to the adjacent surface, but also can maintain the best horizontal driving forces for the OIS system of both lens module 21,22, and also keep the function of tri-axial closed-loop control as well. In the following descriptions, because the first lens module 21 and the second lens module 22 have substantially the same architecture of driving system, and thus only take the first lens module 21 as the example for illustration.

As shown in FIG. 6A, the difference between the first lens module 21 of this first preferred embodiment and the one shown in FIG. 5 is that, the first lens module 21 shown in FIG. 6A further includes at least one smaller auxiliary driving magnet 218 located at the notch side adjacent to the adjacent surface. In this first preferred embodiment, the at least one smaller auxiliary driving magnet 218 includes a second auxiliary driving magnet 218 for decreasing magnetic interference and a third auxiliary driving magnet 218 for decreasing magnetic interference. The second and third auxiliary driving magnets 218 are located opposite to the first auxiliary driving magnet 214. Each one the second and third auxiliary driving magnets 218 has a volume which is smaller than ⅓ of the volume of the first auxiliary driving magnet 214 (for example but not limited to, the length of each one the second and third auxiliary driving magnets 218 is shorter than the length of the first auxiliary driving magnet 214, but the width and height of these auxiliary driving magnets 214, 218 are approximately the same). In addition, the volume of the first auxiliary driving magnet 214 is smaller than ⅓ of the volume of the primary driving magnet 213 (for example but not limited to, the height of the first auxiliary driving magnet 214 is less than the height of the primary driving magnet 213, but the width and length of them are approximately the same). Moreover, these three auxiliary driving magnets 214,218 are mounted in the positioning slots of the frame at a height lower than (i.e., below) the driving coil 215, such that these auxiliary driving magnets 214,218 will not co-work with the driving coil 215 for providing Z-axial driving forces. These three auxiliary driving magnets 214,218 are all with radial magnetization direction, and the polarity thereof is opposite to the lower part of the primary driving magnets 32. Because the volumes of these three auxiliary driving magnets 214,218 are smaller than the primary driving magnet 213, the magnetic interferences caused by these auxiliary driving magnets 214,218 are also smaller. These three auxiliary driving magnets 214,218 are only for co-working with the horizontal circuits to provide horizontal driving forces, not to provide Z-axial driving forces. These three auxiliary driving magnets 214, 218 are respectively positioned at two ends of the elongated primary driving magnet 213 and are mounted in the positioning slots form on the inner surface of the frame. The two smaller auxiliary driving magnets 218 (i.e., the second and third auxiliary driving magnets 218) are positioned at the notch side neighboring the adjacent surface 20, and will cause less magnetic interference due to their relatively small volumes. In the present invention, the distance between the center point along the length of the primary driving magnet 213 of the first lens module 21 and the center point of the spacing between the first and second lens modules 21,22 can be the same with or different from another distance between the center point along the length of the primary driving magnet 223 of the second lens module 22 and the center point of the spacing between the first and second lens modules 21,22.

Figure 6B:
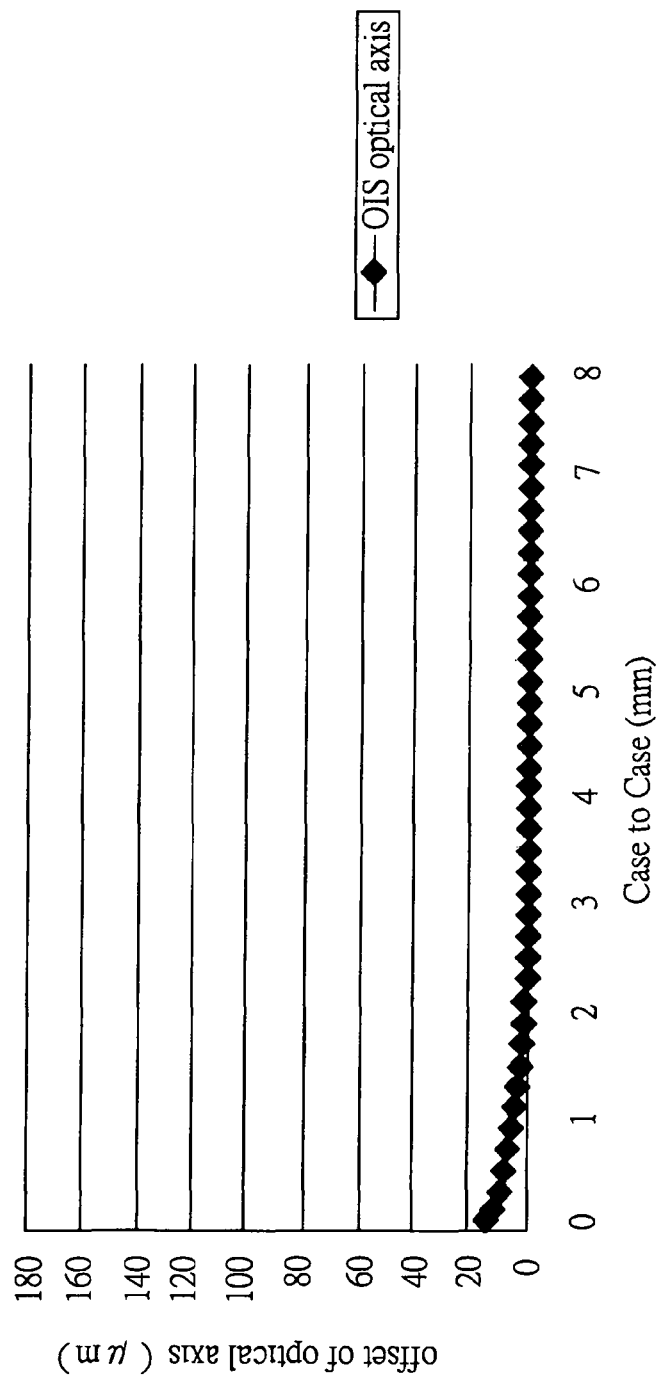
FIG. 6B is a diagram showing a test result of the offset of optical axis influenced by the magnetic interference caused by the driving magnets of the dual lens modules of the image capturing module of the first embodiment of the present invention shown in FIG. 6A.

Please refer to FIG. 6B, which is a diagram showing a test result of the offset of optical axis influenced by the magnetic interference caused by the driving magnets of the dual lens modules of the image capturing module of the first embodiment of the present invention shown in FIG. 6A. As shown in FIG. 6A, the first lens module 21 has its two smaller auxiliary driving magnets 218 (i.e., the second and third auxiliary driving magnets 218) positioned at the notch side neighboring the adjacent surface 20, in addition, the second lens module 22 has its larger auxiliary driving magnets 224 (i.e., the first auxiliary driving magnets 224) positioned at the side neighboring the adjacent surface 20. Due to the fact that the sizes and strengths of magnetic fields of these auxiliary driving magnets 218, 224 are much smaller than that of the primary driving magnets 213, 223, it can be seen from FIG. 6B that, the offset value of optical axis is still kept at a very small value near to zero when the spacing between the outer cases of the first and second lens modules 21, 22 is 1 mm. Even when the first and second lens modules 21, 22 are contacted (i.e., the spacing between the outer cases of the first and second lens modules 21, 22 is zero), the offset value of optical axis is still as small as 16 µm only, which can still keep the first and second lens modules 21, 22 both working well for performing image capturing functions with acceptable quality. Therefore, it can be seen that, the two smaller auxiliary driving magnets 218 (i.e., the second and third auxiliary driving magnets 218) will not cause magnetic interference nor offset of optical axis to the neighboring lens module which is equipped with tri-axial closed-loop control and OIS systems.

In this first preferred embodiment of the image capturing module having multiple lenses, the second and third auxiliary driving magnets 218 are both unipolar magnets with radial magnetization direction, wherein the polarity thereof facing the driving coil can be the same (N pole or S pole). However, in another embodiment, the polarity of the second and third auxiliary driving magnets 218 facing the driving coil can also be different (one is N pole and the other one is S pole). The first auxiliary driving magnet 214 can be either unipolar or bipolar magnet with either radial or Z-axial magnetization direction. The polarity of the first auxiliary driving magnets 214 facing the driving coil can be either the same with or different from the polarity of the lower part of primary driving magnet 213. The primary driving magnet 213 can be either a bipolar magnet with radial magnetization direction, a unipolar magnet with radial magnetization direction, or an assembly of two magnets which include an upper-part magnet and a lower-part magnet both are unipolar magnet with radial magnetization direction facing the driving coil.

Figure 7A:
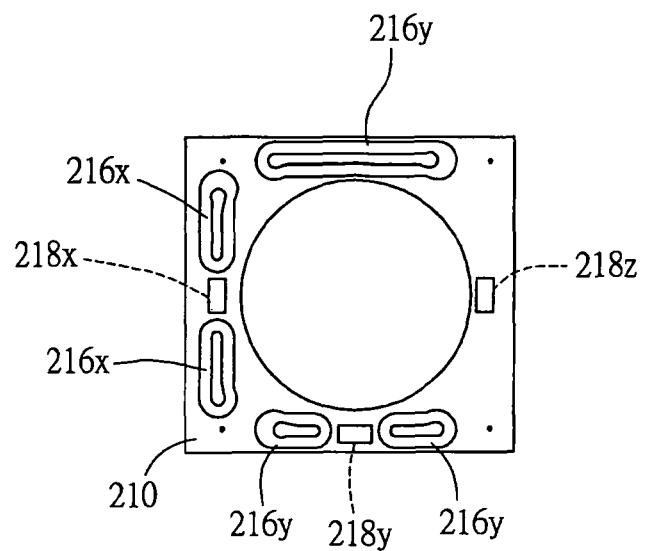
FIG. 7A is a schematic view of the first embodiment of the horizontal circuits formed on the circuit board of the first lens module of the image capturing module having multiple lenses in accordance with the present invention.
Figure 7B:
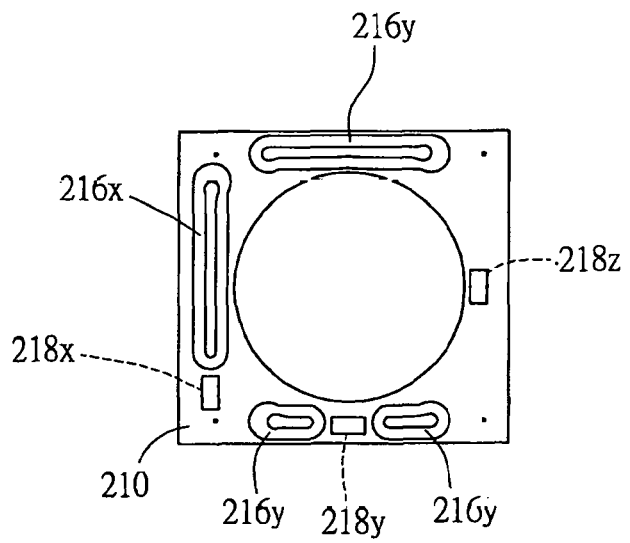
FIG. 7B is a schematic view of the second embodiment of the horizontal circuits formed on the circuit board of the first lens module of the image capturing module having multiple lenses in accordance with the present invention.

Please refer to FIG. 7A and FIG. 7B, in which, FIG. 7A is a schematic view of the first embodiment of the horizontal circuits formed on the circuit board of the first lens module of the image capturing module having multiple lenses in accordance with the present invention, and FIG. 7B is a schematic view of the second embodiment of the horizontal circuits formed on the circuit board of the first lens module of the image capturing module having multiple lenses in accordance with the present invention. As shown in FIG. 7A, the X-axial position sensor 218x and the Y-axial position sensor 218y are respectively located under the spacing areas between two X-axis coils 216x and two Y-axis coils 216y in order to avoid from the magnetic interference caused by the X-axis coils 216x and Y-axis coils 216y. In FIG. 7B, the length of the X-axis coil 216x is shortened at one end thereof in order to provide a space to furnish the X-axial position sensor 218x thereunder. However, shortened X-axis coil 216x will reduce the driving force when applying current on it.

Figure 7C:
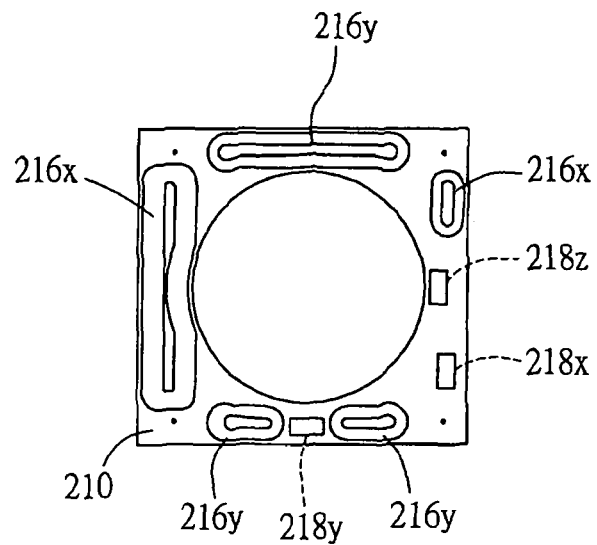
FIG. 7C is a schematic view of the third embodiment of the horizontal circuits formed on the circuit board of the first lens module of the image capturing module having multiple lenses in accordance with the present invention.

FIG. 7C is a schematic view of the third embodiment of the horizontal circuits formed on the circuit board of the first lens module of the image capturing module having multiple lenses in accordance with the present invention. The two X-axis coils 216x co-work with the first auxiliary driving magnet and the second auxiliary driving magnet to generate horizontal driving forces along the X-axis. As shown in FIG. 7C, the X-axial position sensor 218x is located under the third auxiliary driving magnet for avoiding magnetic interference. There is no X-axis coil at the location above the X-axial position sensor 218x. The third auxiliary driving magnet not only can avoid or minimize the magnetic interference, but also can co-work with the X-axial position sensor 218x for providing closed-loop control function. The X-axis coil 216x below the first auxiliary driving magnet will have sufficient length, size and space for providing adequate horizontal driving force along the X-axis direction. The existence of the other X-axis coil 216x below the second auxiliary driving magnet not only can decrease the magnetic interference between neighboring lens modules, but also can co-work with the second auxiliary driving magnet to provide horizontal driving force along the X-axis direction. The embodiment described here is not limited to the order or application of the second and third auxiliary driving magnets to provide the horizontal driving force or the closed-loop control function. It is noted that, the second and third auxiliary driving magnets might both co-work with both the X-axis coil 216x and the X-axial position sensor 218x for providing both the horizontal driving force and the closed-loop control function in the same time, or, in the other hand, one of the second and third auxiliary driving magnets is co-work only with the X-axis coil 216x for providing the horizontal driving force, and the other one of the second and third auxiliary driving magnets is co-work only with the X-axiai position sensor 218x for providing the closed-loop control function.

Figure 7D:
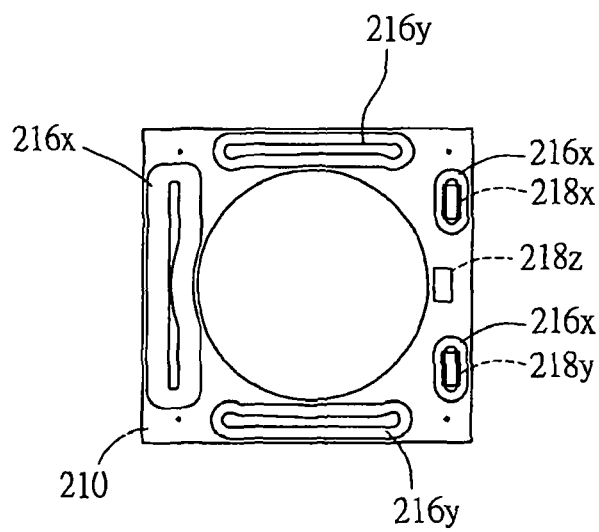
FIG. 7D is a schematic view of the fourth embodiment of the horizontal circuits formed on the circuit board of the first lens module of the image capturing module having multiple lenses in accordance with the present invention.

FIG. 7D is a schematic view of the fourth embodiment of the horizontal circuits formed on the circuit board of the first lens module of the image capturing module having multiple lenses in accordance with the present invention. The difference between the fourth embodiment and the third embodiment shown in FIG. 7C is that, in the fourth embodiment shown in FIG. 7D, the second and third auxiliary driving magnets are respectively co-working with one of the two X-axis coils 216x and the one of the X-axial and Y-axial position sensors 218x, 218y for providing both the horizontal driving force along X-axis and the closed-loop control function in the same time. The two smaller-sized X-axis coils 216x located at the right side (below the second and third auxiliary driving magnets) are together designed to provide the same horizontal driving force as the other larger X-axis coil 216x located at the left side (below the first auxiliary driving magnet) of the lens module for balancing the driving forces. Therefore, the number of windings of the two smaller-sized X-axis coils 216x might not be the same as which of the larger X-axis coil 216x below the first auxiliary driving magnet. Fewer number of windings of the two smaller-sized X-axis coils 216x can decrease the magnetic interference to the X-axial and Y-axial position sensors 218x, 218y. Therefore, the X-axial position sensor 218x can be located under one of the smaller-sized X-axis coils 216x for providing X-axial closed-loop control function, while the Y-axial position sensor 218y can be located under the other one of the smaller-sized X-axis coils 216x for providing Y-axial closed-loop control function. The X-axis coil 216x located below the first auxiliary driving magnet and the Y-axis coils 216y located below the primary driving magnets will have sufficient sizes and spaces for providing the best horizontal driving forces. In case that when the closed-loop control functions along the X-axis and the Y-axis are not necessary, then the X-axial and Y-axial position sensors 218x, 218y can be removed.

Please refer to FIG. 7E to FIG. 7L, which are schematic views of various embodiments of the second preferred embodiment of the image capturing module having multiple lenses in accordance with the present invention. As shown in FIG. 7E to FIG. 7L, no matter how many lens modules are included in the image capturing module having multiple lenses, and how these lens modules are configured and assembled, any two neighboring lens modules will definitely not have their primary driving magnet (or larger auxiliary driving magnet) to be located at the side adjacent to the adjacent surface between these two lens modules at the same time.

Figure 7E:
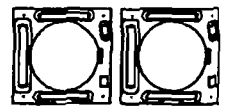
Figure 7F:
Figure 7G:
Figure 7H:
Figure 7I:
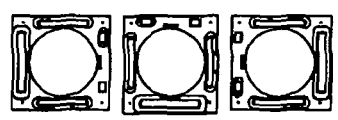

As shown in FIG. 7E to FIG. 7F, the notch side of the first lens module (where the second and third auxiliary driving magnets are located) is facing to right and is adjacent to the adjacent surface between the first and second lens modules. The configuration of the second lens module is the same as the first lens module, that is, the notch side of the second lens module (where the second and third auxiliary driving magnets are located) is also facing to right. The third lens module will be assembled at the right side of the second lens module by following the same configuration. Such that, even more lens modules can be assembled in a line format by following the same configuration.

As shown in FIG. 7G to FIG. 7J, the notch side of the first lens module (where the second and third auxiliary driving magnets are located) is facing to right and is adjacent to the adjacent surface between the first and second lens modules. However, the configuration of the second lens can also be rotated for 90 degrees, 180 degrees or 270 degrees; in addition, more lens modules can be included in the image capturing module having multiple lenses of the present invention. As shown in FIG. 7G to FIG. 7J, the notch side of the first lens module (where the second and third auxiliary driving magnets are located) is facing to right and is adjacent to the adjacent surface between the first and second lens modules. The neighboring second lens module can be any kind of AF lens module or OIS lens module and is not limited to the embodiments of lens modules disclosed in the present invention.

Figure 8A:
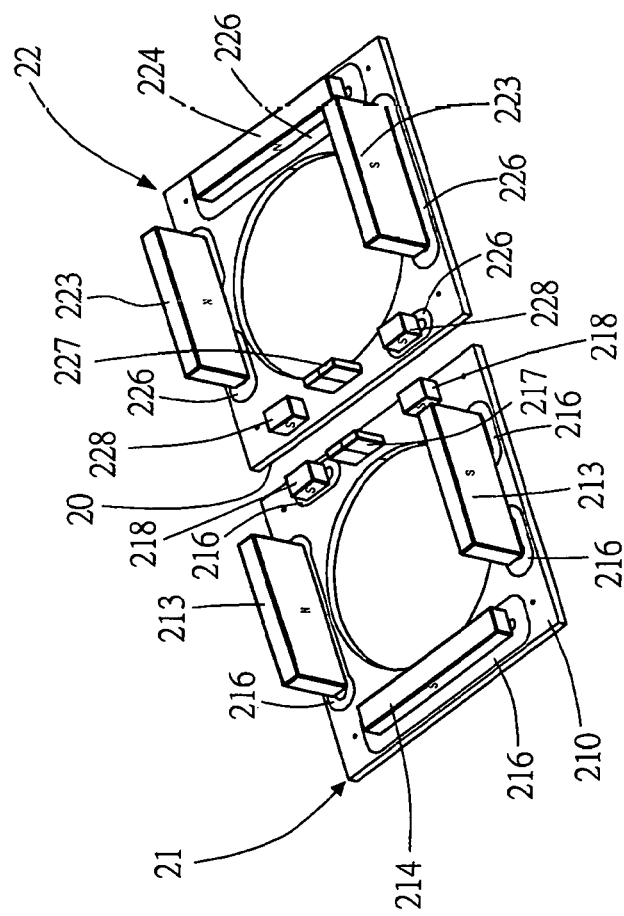
FIG. 8A is a schematic view of the third preferred embodiment of the image capturing module having multiple lenses in accordance with the present invention.
Figure 8B:
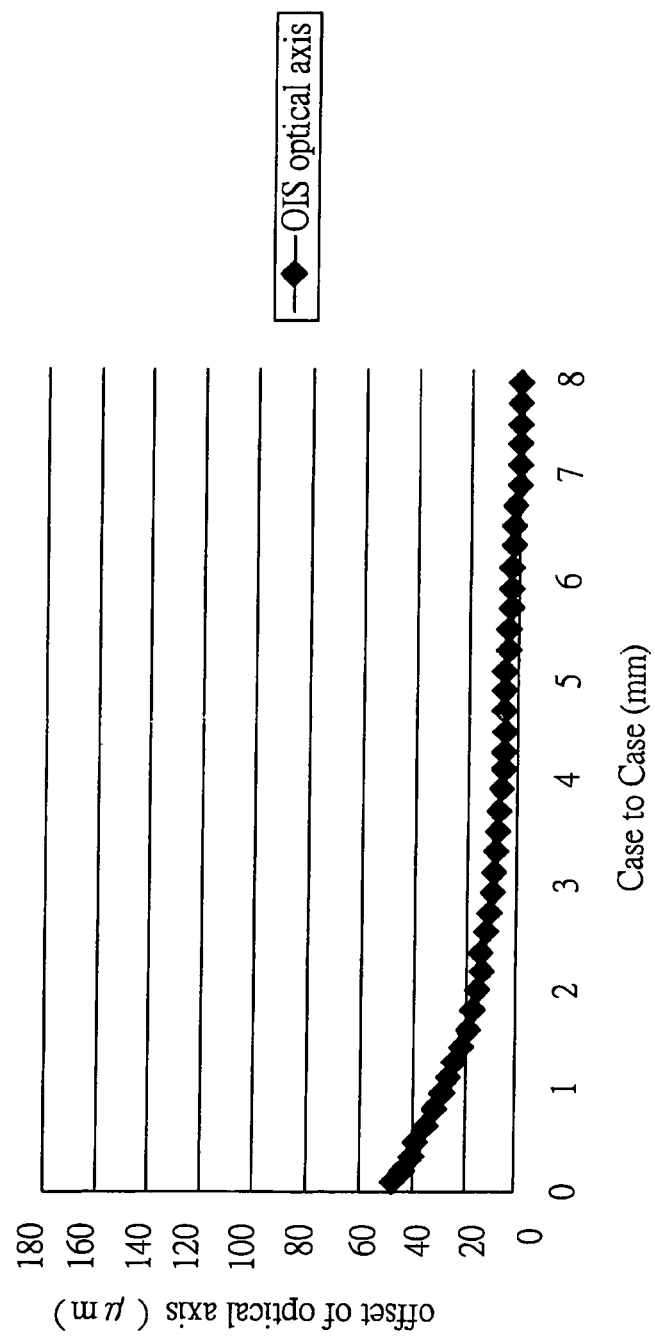
FIG. 8B is a diagram showing a test result of the offset of optical axis influenced by the magnetic interference caused by the driving magnets of the dual lens modules of the image capturing module of the third embodiment of the present invention shown in FIG. 8A.

Please refer to FIG. 8A and FIG. 8B. FIG. 8A is a schematic view of the third preferred embodiment of the image capturing module having multiple lenses in accordance with the present invention. FIG. 8B is a diagram showing a test result of the offset of optical axis influenced by the magnetic interference caused by the driving magnets of the dual lens modules of the image capturing module of the third embodiment of the present invention shown in FIG. 8A. Wherein, the difference between the third preferred embodiment and the first embodiment shown in FIG. 6A is that, in the third preferred embodiment shown in FIG. 8A, the notch side where the smaller second and third auxiliary driving magnets 218,228 are located of the first lens module 21 and the second lens module 22 are both facing and adjacent to the adjacent surface 20. The primary driving magnets 213,223 and the larger first auxiliary driving magnet 214,224 of the first and second lens modules 21,22 are unipolar magnets with radial magnetization direction having their N pole facing to the lens set and driving coil. The smaller second and third auxiliary driving magnets 218,228 of the first and second lens modules 21,22 are unipolar magnets with radial magnetization direction. The S pole of the second and third auxiliary driving magnets 218 of the first lens module 21 is facing to the lens set and driving coil of the first lens module 21, while N pole of the second and third auxiliary driving magnets 228 of the second lens module 22 is facing to the lens set and driving coil of the second lens module 22. As shown in FIG. 8B, according to the concept of summed magnetic fields, it can be seen that the offset value of the optical axis is only 25 μm when the spacing between the outer cases of the first and second lens modules 22 is 1 mm, which is much smaller than the one shown in FIG. 2B or FIG. 3B.

Figure 9A:
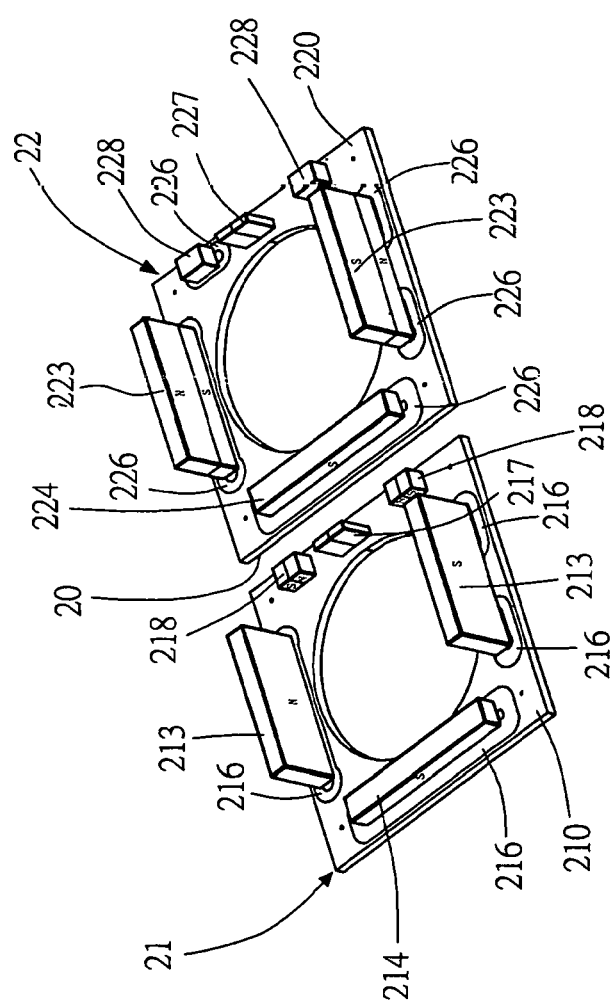
FIG. 9A is a schematic view of the fourth preferred embodiment of the image capturing module having multiple lenses in accordance with the present invention.
Figure 9B:
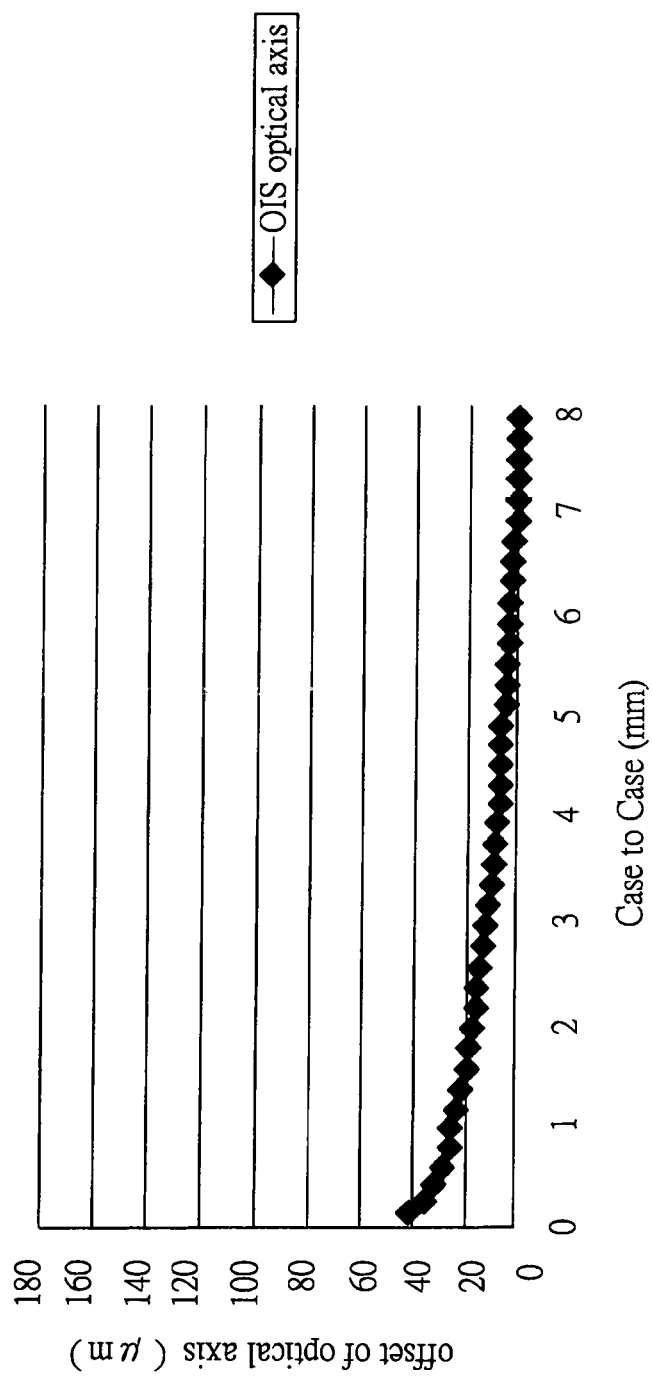
FIG. 9B is a diagram showing a test result of the offset of optical axis influenced by the magnetic interference caused by the driving magnets of the dual lens modules of the image capturing module of the fourth embodiment of the present invention shown in FIG. 9A.

Please refer to FIG. 9A and FIG. 9B. FIG. 9A is a schematic view of the fourth preferred embodiment of the image capturing module having multiple lenses in accordance with the present invention. FIG. 9B is a diagram showing a test result of the offset of optical axis influenced by the magnetic interference caused by the driving magnets of the dual lens modules of the image capturing module of the fourth embodiment of the present invention shown in FIG. 9A. Wherein, the difference between the fourth preferred embodiment and the first embodiment shown in FIG. 6A is that, in the fourth preferred embodiment shown in FIG. 9A, the primary driving magnets 213 are unipolar magnets, however, the smaller second and third auxiliary driving magnets 218 of the first lens module 21 are bipolar magnets with radial magnetization direction facing to the lens set and driving coil. As shown in FIG. 9B, according to the concept of summed magnetic fields, it can be seen that the offset value of the optical axis is only 23 m when the spacing between the outer cases of the first and second lens modules 21,22 is 1 mm, which is much smaller than the one shown in FIG. 2B or FIG. 3B. According to the fourth embodiment shown in FIG. 9A, the heights of the larger first auxiliary driving magnets 214, 224 are respectively higher than the heights of the second and third auxiliary driving magnets 218, 228, but are lower than the heights of the primary driving magnets 213, 223.

Figure 10A:
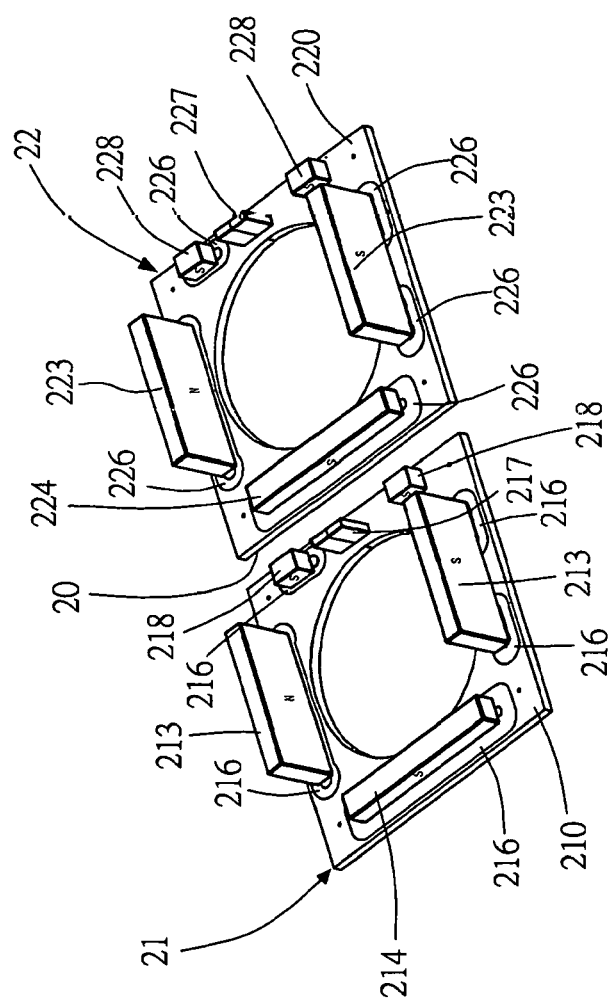
FIG. 10A is a schematic view of the fifth preferred embodiment of the image capturing module having multiple lenses in accordance with the present invention.
Figure 10B:
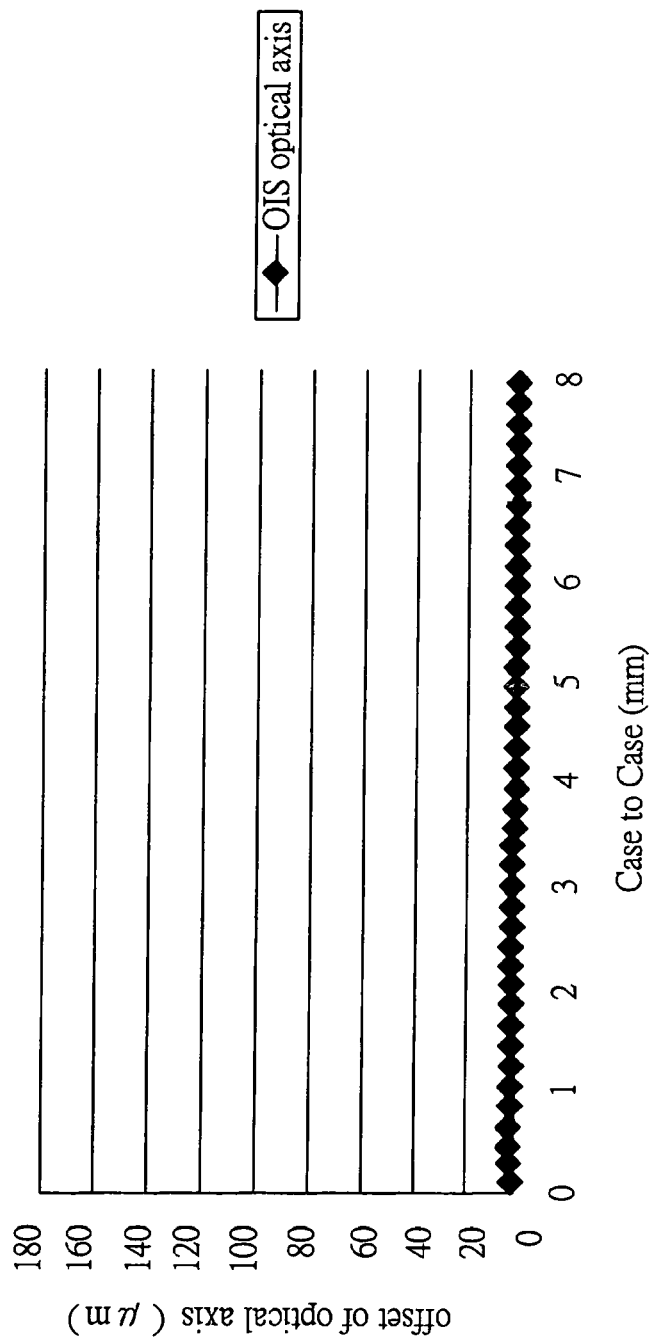
FIG. 10B is a diagram showing a test result of the offset of optical axis influenced by the magnetic interference caused by the driving magnets of the dual lens modules of the image capturing module of the fifth embodiment of the present invention shown in FIG. 10A.

Please refer to FIG. 10A and FIG. 10B. FIG. 10A is a schematic view of the fifth preferred embodiment of the image capturing module having multiple lenses in accordance with the present invention. FIG. 10B is a diagram showing a test result of the offset of optical axis influenced by the magnetic interference caused by the driving magnets of the dual lens modules of the image capturing module of the fifth embodiment of the present invention shown in FIG. 10A. Wherein, the difference between the fifth preferred embodiment and the first embodiment shown in FIG. 6A is that, in the fifth preferred embodiment shown in FIG. 10A, the primary driving magnets 213,223 and the larger first auxiliary driving magnets 214,224 of the first and second lens modules 21,22 are unipolar magnets with radial magnetization direction having their N pole facing to the lens set and driving coil. The smaller second and third auxiliary driving magnets 218,228 are unipolar magnets with radial magnetization direction having their S pole facing to the lens set and driving coil. That means, the pole of the second and third auxiliary driving magnets 218,228 facing to the lens set is opposite to the pole of the primary driving magnets 213,223 and the first auxiliary driving magnets 214,224. As shown in FIG. 10B, according to the concept of summed magnetic fields, it can be seen that the offset value of the optical axis is close to zero even when the spacing between the outer cases of the first and second lens modules 21,22 is 0 mm, there is almost no magnetic interference between the first and second lens modules 21,22 at all.

Figure 11A:
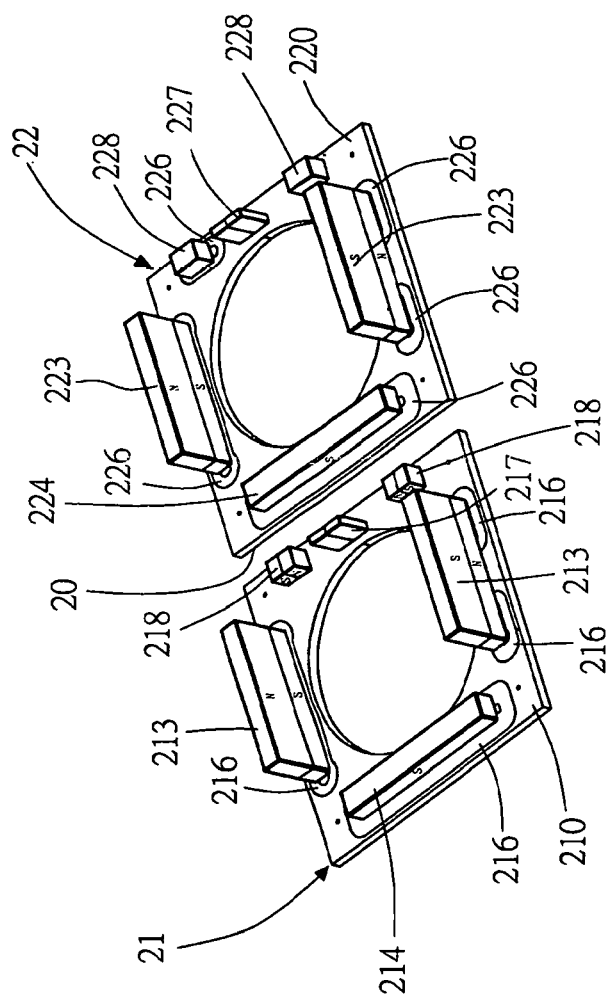
FIG. 11A is a schematic view of the sixth preferred embodiment of the image capturing module having multiple lenses in accordance with the present invention.

Please refer to FIG. 11A, which is a schematic view of the sixth preferred embodiment of the image capturing module having multiple lenses in accordance with the present invention. The difference between the sixth preferred embodiment and the first embodiment shown in FIG. 6A is that, in the sixth preferred embodiment shown in FIG. 11A, the smaller second and third auxiliary driving magnets 218 of the first lens modules 21 are bipolar magnets with radial magnetization direction.

Figure 11B:
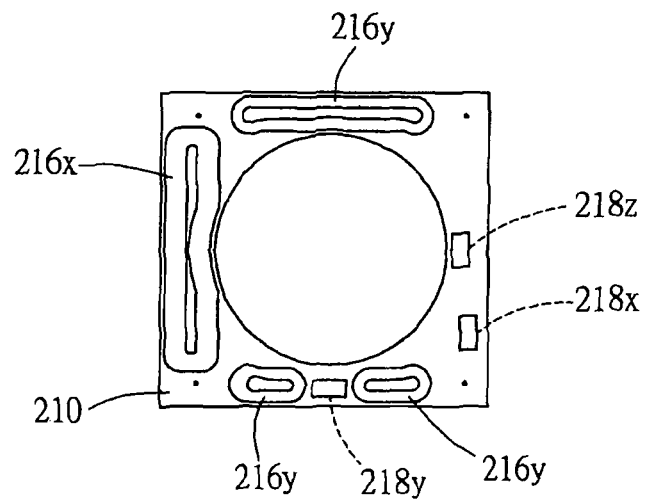
FIG. 11B is a schematic view of the seventh preferred embodiment of the image capturing module having multiple lenses in accordance with the present invention.

FIG. 11B is a schematic view of the seventh preferred embodiment of the image capturing module having multiple lenses in accordance with the present invention. Please refer to both FIG. 11B and FIG. 11A, taking the first lens set 21 as an example, the first auxiliary driving magnet 214 co-works with the X-axis coil 216x to provide X-axial driving force, in addition, the X-axial position sensor 218x is located right below either the second or the third auxiliary driving magnet 218. The second and third auxiliary driving magnets 218 not only can avoid (decrease) magnetic interference, but also can provide feedback magnetic fields for closed-loop control function. That is, in the seventh preferred embodiment shown in FIG. 11B, there is no X-axis coils being furnished below the second and third auxiliary driving magnets 218 which in turn are merely for providing closed-loop control function and avoiding magnetic interference. The X-axis coil 216x located below the first auxiliary driving magnet 214 has sufficient length, size and space for providing the horizontal driving force along X-axis.

Figure 11C:
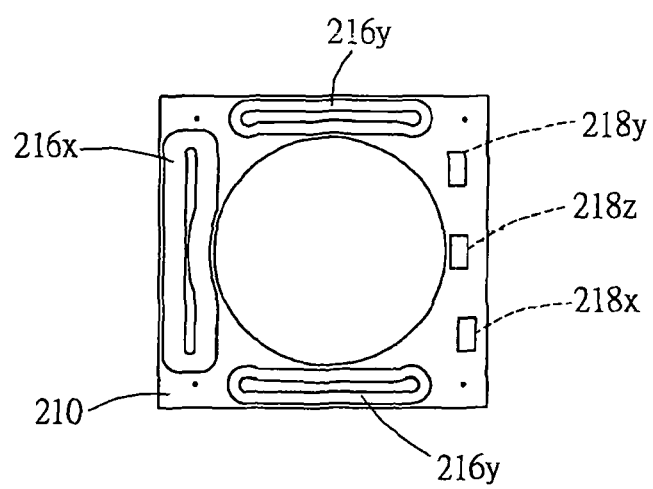
FIG. 11C is a schematic view of the eighth preferred embodiment of the image capturing module having multiple lenses in accordance with the present invention.

FIG. 11C is a schematic view of the eighth preferred embodiment of the image capturing module having multiple lenses in accordance with the present invention. Please refer to both FIG. 11C and FIG. 11A. Taking the first lens set 21 as an example; the difference between the eighth preferred embodiment and the seventh preferred embodiment shown in FIG. 11B is that, in the eighth preferred embodiment shown in FIG. 11C, the Y-axial position sensor 218y is located right below the second auxiliary driving magnet 218. By using the configuration of bipolar magnetic field of the second auxiliary driving magnet 218, even though the Y-axial position sensor 218y and the second auxiliary driving magnet 218 are located at the notch side adjacent to the adjacent surface, the Y-axial position sensor 218y furnished on the external circuit below the second auxiliary driving magnet 218 can still detect the Y-axial moving distance of the lens set relative to the optical axis. Thereby, the X-axis coil 216x and Y-axis coils 216y located below the first auxiliary driving magnet 214 and the primary driving magnets 213 respectively can have sufficient length, size and space for providing the horizontal driving force along X-axis and Y-axis.

Figure 12A:
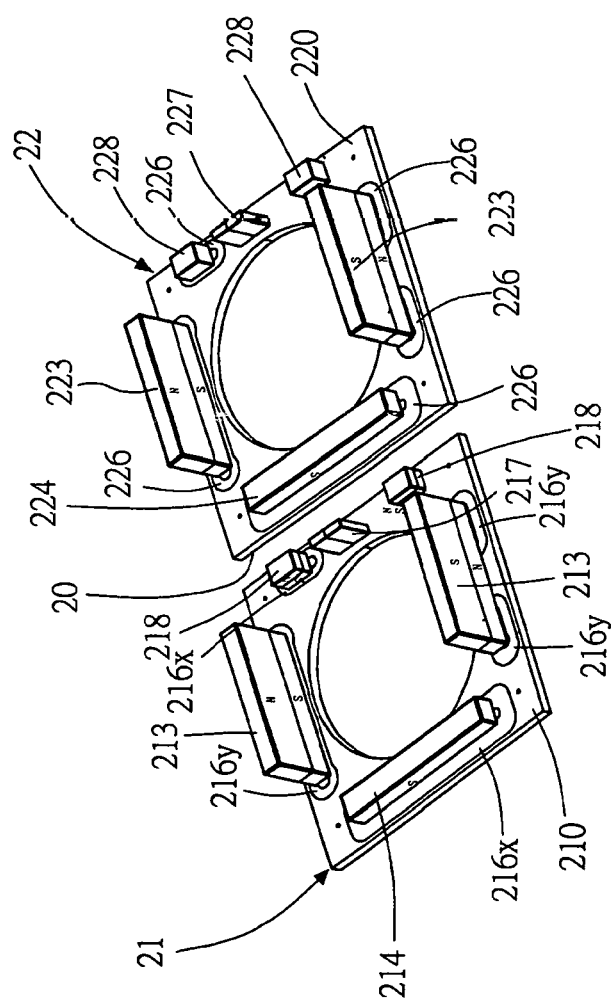
FIG. 12A is a schematic view of the ninth preferred embodiment of the image capturing module having multiple lenses in accordance with the present invention.

FIG. 12A is a schematic view of the ninth preferred embodiment of the image capturing module having multiple lenses in accordance with the present invention. Taking the first lens set 21 as an example, the difference between the ninth preferred embodiment and the sixth preferred embodiment shown in FIG. 11A is that, in the ninth preferred embodiment shown in FIG. 12A, the configuration of both the second and third auxiliary driving magnets 218 is an up/down bipolar magnet with radial magnetization direction. The lager first auxiliary magnet 214 and the smaller second auxiliary magnet 218 co-work with the two corresponding X-axis coils 216x for providing X-axial driving force. The X-axial position sensor is located below the third auxiliary magnet 218. The third auxiliary driving magnet 218 not only can avoid (decrease) magnetic interference, but also can provide feedback magnetic fields for closed-loop control function. That is, in the ninth preferred embodiment shown in FIG. 12A, there is no X-axis coil being furnished below the third auxiliary driving magnet 218 which in turn are merely for avoiding magnetic interference and detecting X-axial displacements of the lens set for providing closed-loop control function. The X-axis coil 216x located below the first auxiliary driving magnet 214 has sufficient length, size and space for providing the horizontal driving force along X-axis. The second auxiliary driving magnet 218 not only can avoid (decrease) magnetic interference between the first and second lens module 21,22, but also can co-work with the X-axis coil below for providing X-axial driving force. The embodiment described here is not limited to the configuration, order or application of the second and third auxiliary driving magnets 218 to provide the horizontal driving force or the closed-loop control function. It is possible that the second and third auxiliary driving magnets 218 are both co-working with an X-axis coil 216x thereunder for providing the horizontal driving force, while the X-axial position sensor is also located below the third auxiliary magnet 218 for providing closed-loop control function.

Figure 12B:
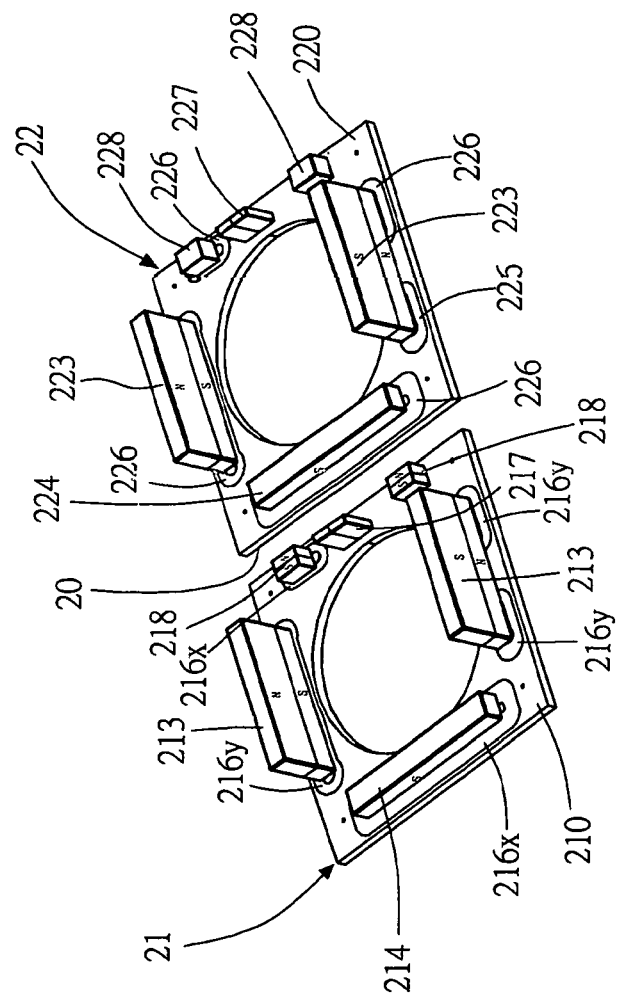
FIG. 12B is a schematic view of the tenth preferred embodiment of the image capturing module having multiple lenses in accordance with the present invention.

FIG. 12B is a schematic view of the tenth preferred embodiment of the image capturing module having multiple lenses in accordance with the present invention. Taking the first lens set 21 as an example, the difference between the tenth preferred embodiment and the first preferred embodiment shown in FIG. 6A is that, in the tenth preferred embodiment shown in FIG. 12B, the second auxiliary driving magnet 218 and the third auxiliary driving magnet 218 for avoiding magnetic interference are both bipolar magnet with Z-axial magnetization direction. However, in another embodiment, the bipolar Z-axial magnetized second and third auxiliary driving magnets 218 can also be unipolar Z-axial magnetized magnets. The lager first auxiliary magnet 214 and the smaller second auxiliary magnet 218 co-work with the two corresponding X-axis coils 216x for providing X-axial driving forces. The X-axial position sensor is located below the third auxiliary magnet 218. The third auxiliary driving magnet 218 for avoiding magnetic interference not only can avoid (decrease) magnetic interference, but also can provide feedback magnetic fields for closed-loop control function. That is, in the tenth preferred embodiment shown in FIG. 12B, there is no X-axis coil being furnished below the third auxiliary driving magnet 218 which in turn are merely for avoiding magnetic interference and detecting X-axial displacements of the lens set for providing closed-loop control function. The X-axis coil 216x located below the first auxiliary driving magnet 214 has sufficient length, size and space for providing the horizontal driving force along X-axis. The second auxiliary driving magnet 218 not only can avoid (decrease) magnetic interference between the first and second lens module 21,22, but also can co-work with the X-axis coil below for providing X-axial driving force. Wherein, when the second and third auxiliary driving magnets 218 are Z-axial magnetized magnets, the volume of the second and third auxiliary driving magnets 218 is smaller than ⅓ of the first auxiliary driving magnet 214. The volume of the first auxiliary driving magnet 214 is smaller than the volume of the primary driving magnet 213. The embodiment described here is not limited to the order or application of the second and third auxiliary driving magnets 218 to provide the horizontal driving force or the closed-loop control function. It is possible that the second and third auxiliary driving magnets 218 are both co-working with an X-axis coil 216x thereunder for providing the horizontal driving force, while the X-axial position sensor is also located below the third auxiliary magnet 218 for providing closed-loop control function.

Figure 12C:
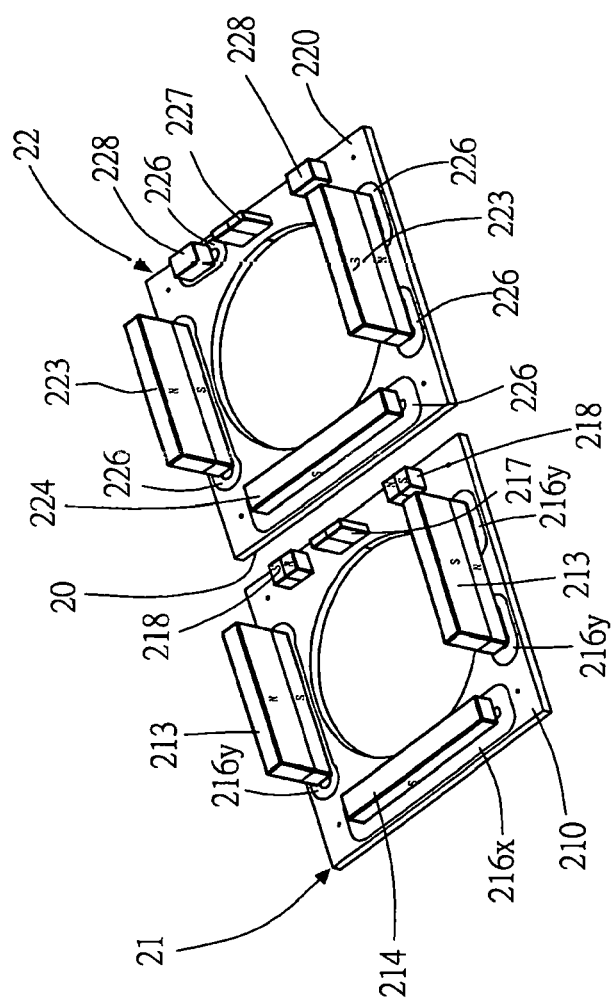
FIG. 12C is a schematic view of the eleventh preferred embodiment of the image capturing module having multiple lenses in accordance with the present invention.

FIG. 12C is a schematic view of the eleventh preferred embodiment of the image capturing module having multiple lenses in accordance with the present invention. Taking the first lens set 21 as an example, the difference between the eleventh preferred embodiment and the tenth preferred embodiment shown in FIG. 12B is that, in the eleventh preferred embodiment shown in FIG. 12C, the second and third auxiliary driving magnets 218 for avoiding magnetic interference are both bipolar magnet with Z-axial magnetization direction, in which, the distribution of polarities is in a circumferential arrangement. There is no X-axis coil being furnished under the second and third auxiliary driving magnets 218, in addition, the X-axial position sensor is located below either the second or the third auxiliary driving magnet 218, such that, the second or the third auxiliary driving magnet 218 not only can avoid magnetic interference but also can provide X-axial closed-loop control function.

Figure 12D:
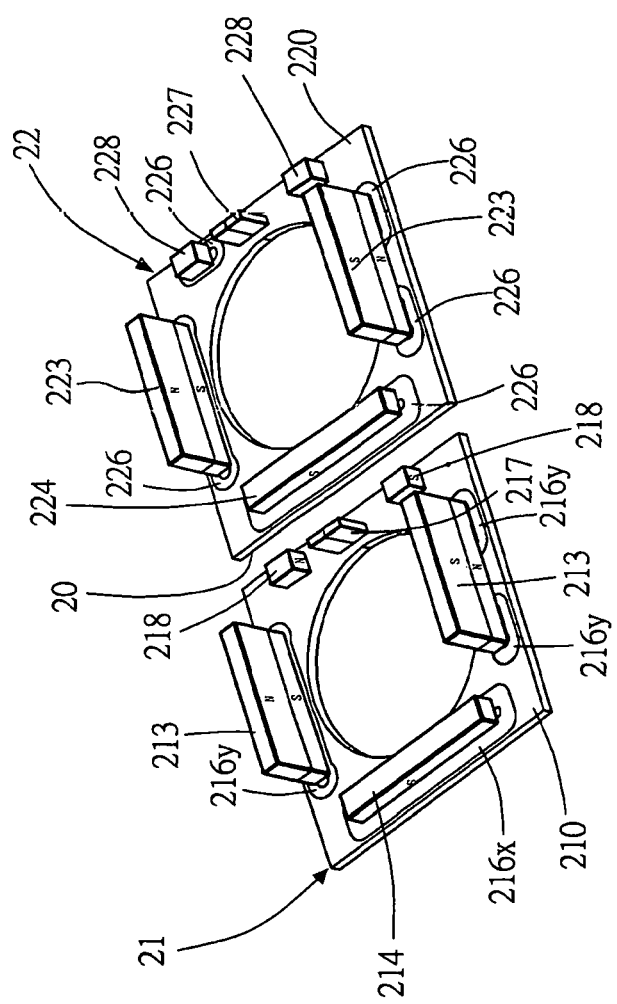
FIG. 12D is a schematic view of the twelfth preferred embodiment of the image capturing module having multiple lenses in accordance with the present invention.

FIG. 12D is a schematic view of the twelfth preferred embodiment of the image capturing module having multiple lenses in accordance with the present invention. Taking the first lens set 21 as an example, the difference between the twelfth preferred embodiment and the first preferred embodiment shown in FIG. 6A is that, in the twelfth preferred embodiment shown in FIG. 12D, the second and third auxiliary driving magnets 218 for avoiding magnetic interference are both unipolar magnet with circumferential magnetization direction, which means, the magnetization directions of the second and third auxiliary driving magnets 218 are facing to each other. There is no X-axis coil being furnished under the second and third auxiliary driving magnets 218, in addition, the X-axial position sensor is located below either the second or the third auxiliary driving magnet 218, such that, the second or the third auxiliary driving magnet 218 not only can avoid magnetic interference but also can provide X-axial closed-loop control function. In another embodiment, the unipolar circumferential magnetized second and third auxiliary driving magnets 218 can also be bipolar configurations.

Figure 12E:
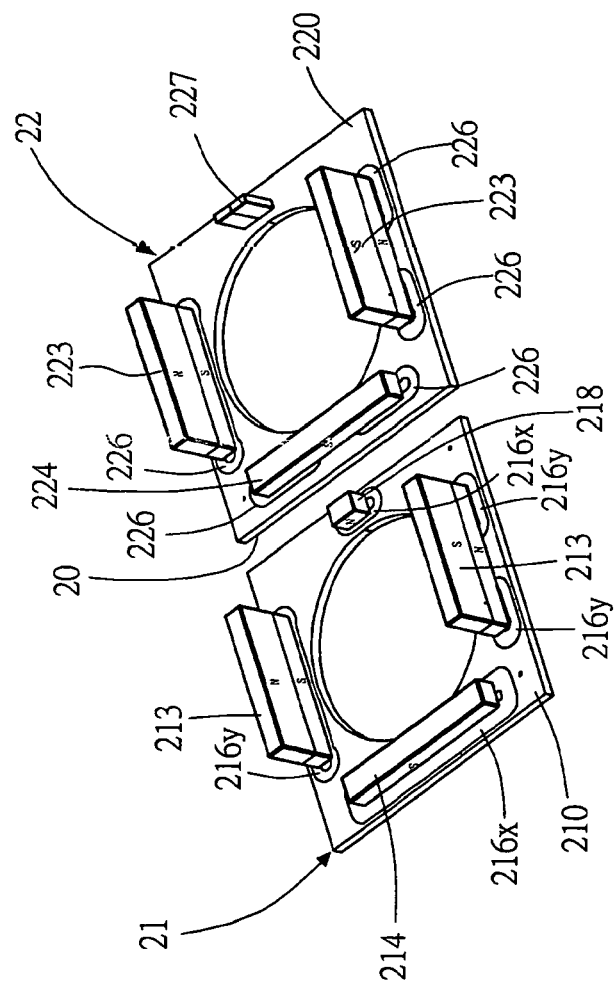
FIG. 12E is a schematic view of the thirteenth preferred embodiment of the image capturing module having multiple lenses in accordance with the present invention.

FIG. 12E is a schematic view of the thirteenth preferred embodiment of the image capturing module having multiple lenses in accordance with the present invention. Taking the first lens set 21 as an example, the difference between the thirteenth preferred embodiment and the first preferred embodiment shown in FIG. 6A is that, in the thirteenth preferred embodiment shown in FIG. 12E, there is only one smaller second auxiliary driving magnet 218 being furnished at the notch side adjacent to the adjacent surface 20 for avoiding magnetic interference. The smaller second auxiliary driving magnet 218 is located at a middle point of the notch side opposite to the larger first auxiliary driving magnet 214. The first and second auxiliary driving magnets 214, 218 are unipolar magnets with radial magnetization direction. In this thirteenth preferred embodiment, the polarity of the first and second auxiliary driving magnets 214, 218 is opposite to the lower part of the primary driving magnet 213. However, in another embodiment, the polarity of the first and second auxiliary driving magnets 214, 218 can also be the same as the lower part of the primary driving magnet 213. By the configuration and arrangement of the magnetic field of the second auxiliary driving magnet 218, the magnetic interference between the first and second lens module 21,22 can be minimized.

The second auxiliary driving magnet 218 is unipolar with radial magnetization direction and is mounted in the positioning slot of the frame; in addition, the polarity of the second auxiliary driving magnet 218 can be either N pole or S pole facing to the first auxiliary driving magnet 214. The first auxiliary driving magnet 214 is either unipolar or bipolar with radial magnetization direction. The polarity of the first auxiliary driving magnet 214 facing to the lens set can be either opposite to or the same with the polarity of the lower part of the primary driving magnet 213. The configuration of the primary driving magnets 213 is bipolar with radial magnetization direction. However, in another embodiment, the primary driving magnets 213 can also be unipolar with radial magnetization direction, or an assembly of two magnets which include an upper-part magnet and a lower-part magnet both are unipolar magnet with radial magnetization direction facing the driving coil.

The larger first auxiliary driving magnet 214 and the smaller second auxiliary driving magnet 218 for avoiding magnetic interference co-work with the corresponding X-axis coils 216x for providing X-axial driving forces. The X-axial position sensor is mounted on the external circuit and is located below the second auxiliary driving magnet 218 and the X-axis coil 216x.

The second auxiliary driving magnet 218 not only can avoid (decrease) magnetic interference between the first and second lens module 21,22, but also can co-work with the X-axis coil 216x below for providing X-axial driving force, and also co-work with the X-axial position sensor for providing closed-loop control function. The other X-axis coil 216x located below the first auxiliary driving magnet 214 has sufficient length and space to generate adequate X-axial driving forces. The embodiment described here is not limited to the configuration or application of the second auxiliary driving magnet 218 to provide the horizontal driving force and the closed-loop control function. It is possible that the second auxiliary driving magnet 218 only co-works with either one of the X-axis coil 216x or the X-axial position sensor for providing one of the horizontal driving force or closed-loop control function only.

Figure 12F:
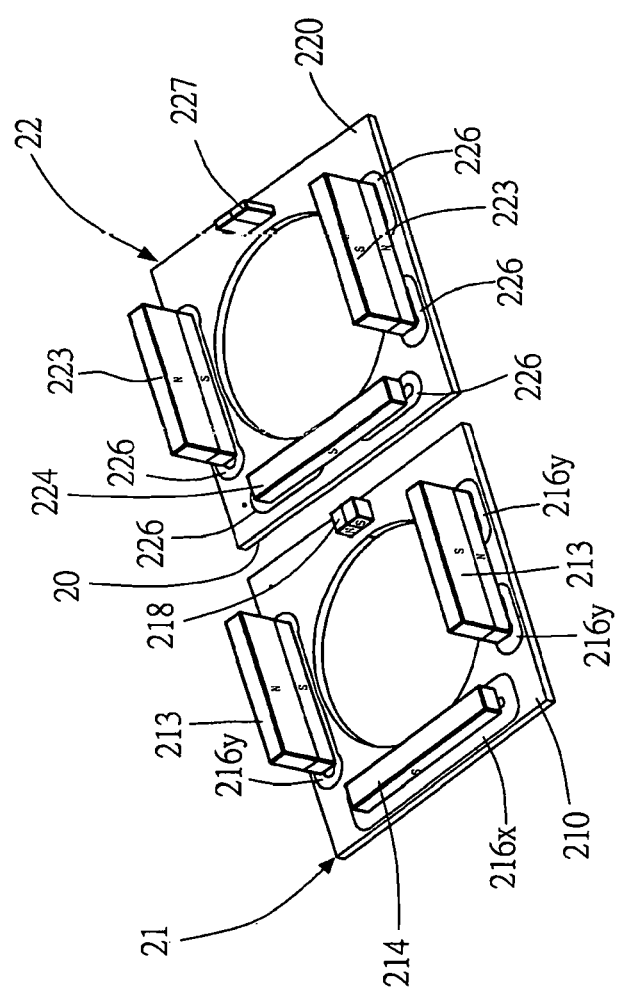
FIG. 12F is a schematic view of the fourteenth preferred embodiment of the image capturing module having multiple lenses in accordance with the present invention.

FIG. 12F is a schematic view of the fourteenth preferred embodiment of the image capturing module having multiple lenses in accordance with the present invention. Taking the first lens set 21 as an example, the difference between the fourteenth preferred embodiment and the thirteenth preferred embodiment shown in FIG. 12E is that, in the fourteenth preferred embodiment shown in FIG. 12F, the smaller second auxiliary driving magnet 218 for avoiding magnetic interference is in a dipolar configuration and is located at the notch side adjacent to the adjacent surface 20. The first auxiliary driving coil 214 co-works with the X-axis coil 216x for providing the X-axial driving forces. The X-axial position sensor is located under and co-works with the second auxiliary driving magnet 218 for avoiding magnetic interference and providing magnetic field feedback functions. That is, there is no X-axis coil being furnished under the second auxiliary driving magnet 218. The X-axis coil 216x located below the first auxiliary driving coil 214 has sufficient length and space for providing adequate X-axial driving forces.

In another embodiment of the present invention, because the second auxiliary driving magnet 218 is a dipolar magnet with radial magnetization direction, the Y-axis position sensor can also be located under the second auxiliary driving magnet 218. By using the configuration of bipolar magnetic field of the second auxiliary driving magnet 218, even though the Y-axial position sensor and the second auxiliary driving magnet 218 are located at the notch side adjacent to the adjacent surface, the Y-axial position sensor furnished on the external circuit below the second auxiliary driving magnet 218 can still detect the Y-axial moving distance of the lens set relative to the optical axis. Such that Y-axis coils 216y below the primary driving magnets 213 can have sufficient length and space for providing Y-axial driving forces.

Figure 12G:
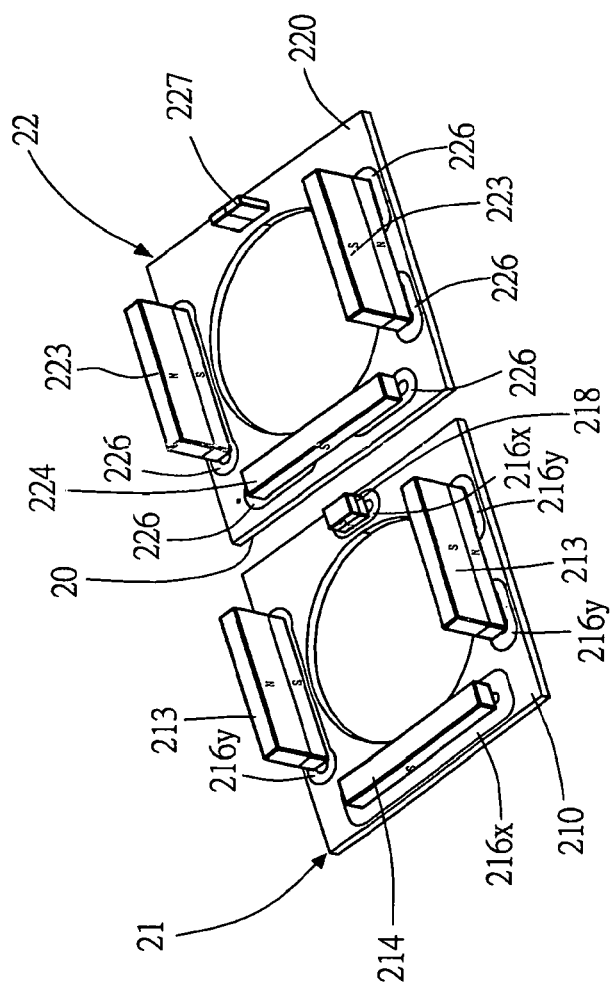
FIG. 12G is a schematic view of the fifteenth preferred embodiment of the image capturing module having multiple lenses in accordance with the present invention.

FIG. 12G is a schematic view of the fifteenth preferred embodiment of the image capturing module having multiple lenses in accordance with the present invention. Taking the first lens set 21 as an example, the difference between the fifteenth preferred embodiment and the thirteenth preferred embodiment shown in FIG. 12E is that, in the fifteenth preferred embodiment shown in FIG. 12G, the smaller second auxiliary driving magnet 218 for avoiding magnetic interference is in an up/down dipolar configuration with radial magnetization direction and is located at the notch side adjacent to the adjacent surface 20. The first auxiliary driving coil 214 and the second auxiliary driving magnet 218 for avoiding magnetic interference co-work with the X-axis coils 216x for providing the X-axial driving forces. The X-axial position sensor is located under and co-works with the second auxiliary driving magnet 218 for avoiding magnetic interference, providing magnetic field feedback function, and providing X-axial driving forces. The X-axis coil 216x located below the first auxiliary driving coil 214 has sufficient length and space for providing adequate X-axial driving forces. The embodiment described here is not limited to the configuration or application of the second auxiliary driving magnet 218 to provide the horizontal driving force and the closed-loop control function. It is possible that the second auxiliary driving magnet 218 only co-works with either one of the X-axis coil 216x or the X-axial position sensor for providing one of the horizontal driving force or closed-loop control function only.

Figure 12H:
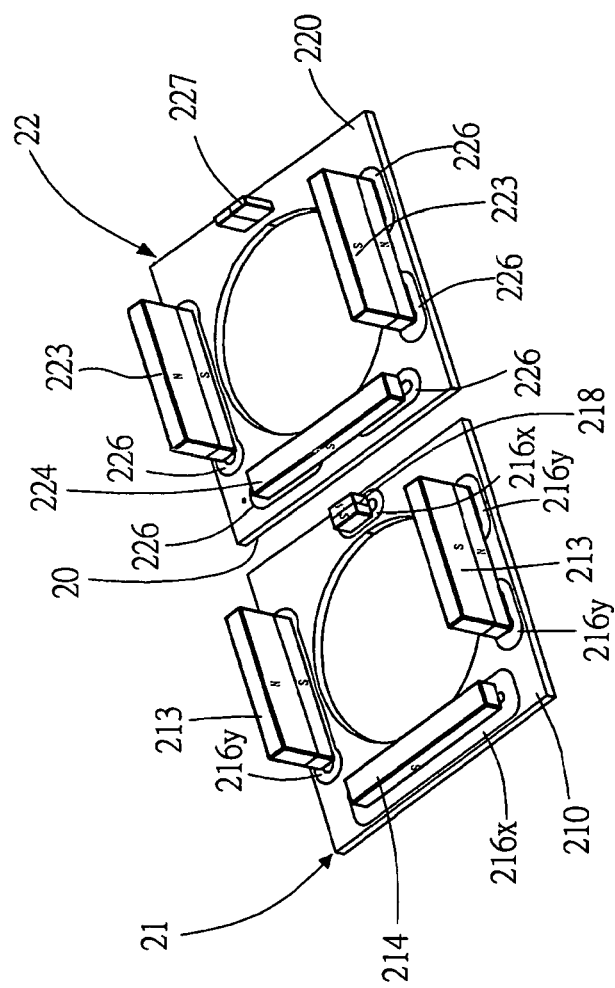
FIG. 12H is a schematic view of the sixteenth preferred embodiment of the image capturing module having multiple lenses in accordance with the present invention.

FIG. 12H is a schematic view of the sixteenth preferred embodiment of the image capturing module having multiple lenses in accordance with the present invention. Taking the first lens set 21 as an example, the difference between the sixteenth preferred embodiment and the thirteenth preferred embodiment shown in FIG. 12E is that, in the sixteenth preferred embodiment shown in FIG. 12H, the smaller second auxiliary driving magnet 218 for avoiding magnetic interference is a dipolar magnet with Z-axial magnetization direction and is located at the notch side adjacent to the adjacent surface 20. However, in another embodiment, the second auxiliary driving magnet 218 can also be a unipolar magnet with Z-axial magnetization direction. The first auxiliary driving coil 214 and the second auxiliary driving magnet 218 for avoiding magnetic interference co-work with the X-axis coils 216x for providing the X-axial driving forces. The X-axial position sensor is located under and co-works with the second auxiliary driving magnet 218 for avoiding magnetic interference, providing magnetic field feedback function, and providing X-axial driving forces. The X-axis coil 216x located below the first auxiliary driving coil 214 has sufficient length and space for providing adequate X-axial driving forces. The embodiment described here is not limited to the configuration or application of the second auxiliary driving magnet 218 to provide the horizontal driving force and the closed-loop control function. It is possible that the second auxiliary driving magnet 218 only co-works with either one of the X-axis coil 216x or the X-axial position sensor for providing one of the horizontal driving force or closed-loop control function only.

Figure 12I:
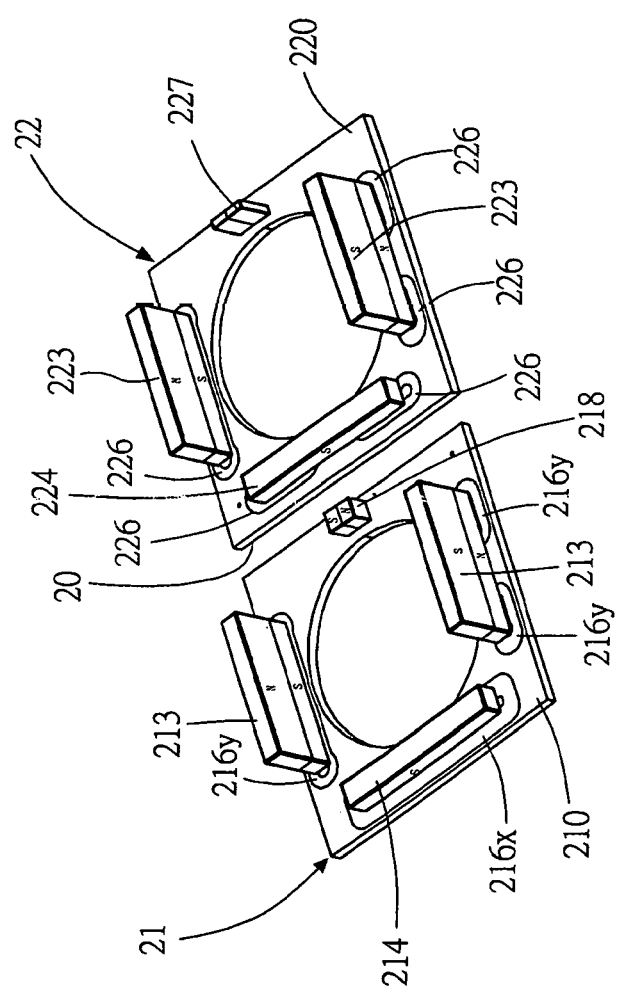
FIG. 12I is a schematic view of the seventeenth preferred embodiment of the image capturing module having multiple lenses in accordance with the present invention.

FIG. 12I is a schematic view of the seventeenth preferred embodiment of the image capturing module having multiple lenses in accordance with the present invention. Taking the first lens set 21 as an example, the difference between the seventeenth preferred embodiment and the thirteenth preferred embodiment shown in FIG. 12E is that, in the seventeenth preferred embodiment shown in FIG. 12I, the smaller second auxiliary driving magnet 218 for avoiding magnetic interference is a dipolar magnet with Z-axial magnetization direction, in which, the distribution of polarities is in a circumferential arrangement. The second auxiliary driving magnet 218 not only can avoid magnetic interference but also can provide X-axial closed-loop control function.

Figure 12J:
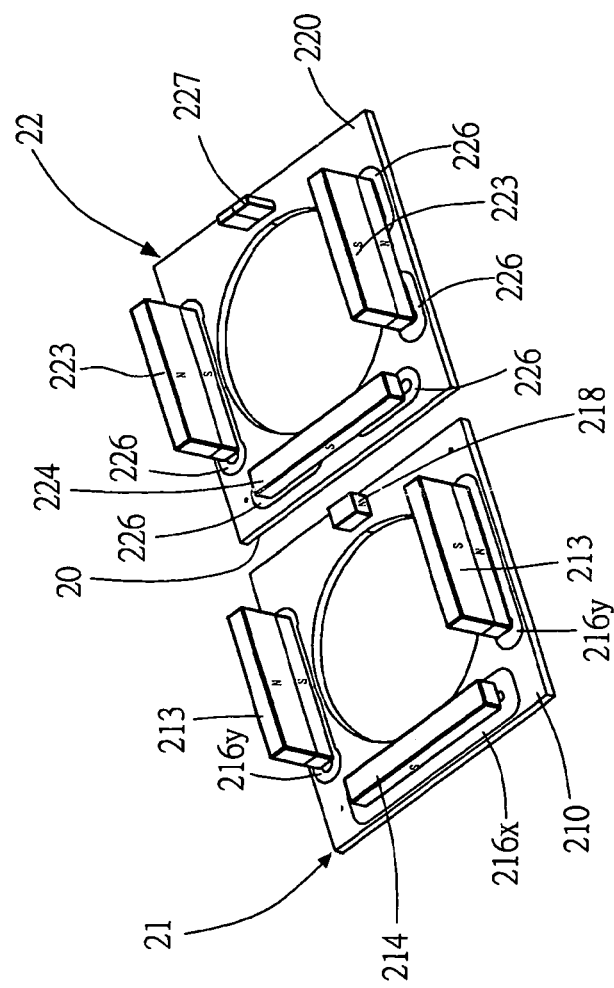
FIG. 12J is a schematic view of the eighteenth preferred embodiment of the image capturing module having multiple lenses in accordance with the present invention.

FIG. 12J is a schematic view of the eighteenth preferred embodiment of the image capturing module having multiple lenses in accordance with the present invention. Taking the first lens set 21 as an example, the difference between the eighteenth preferred embodiment and the thirteenth preferred embodiment shown in FIG. 12E is that, in the eighteenth preferred embodiment shown in FIG. 12J, the smaller second auxiliary driving magnet 218 for avoiding magnetic interference is a unipolar magnet with circumferential magnetization direction, which means, the magnetization direction of the unipolar second auxiliary driving magnet 218 is facing to the primary driving magnet 213. The second auxiliary driving magnet 218 not only can avoid magnetic interference but also can provide X-axial closed-loop control function. In another embodiment, the unipolar second auxiliary driving magnet 218 can also be bipolar.

Figure 13A:
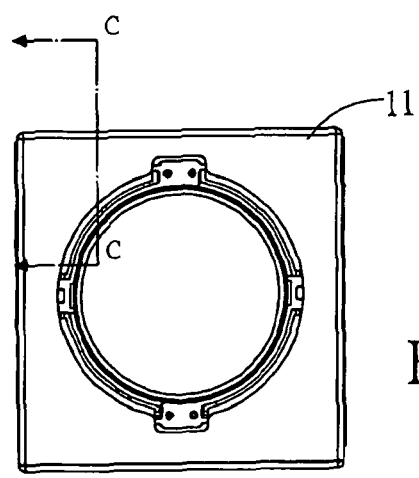
FIG. 13A and FIG. 13B respectively are the top view and C-C sectional view of the first lens set of the nineteenth preferred embodiment of the image capturing module having multiple lenses in accordance with the present invention.
Figure 13B:
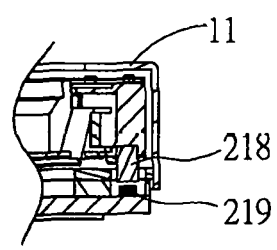

Please refer to FIG. 13A and FIG. 13B, which respectively are the top view and C-C sectional view of the first lens set of the nineteenth preferred embodiment of the image capturing module having multiple lenses in accordance with the present invention. Taking the first lens set as an example, the difference between the nineteenth preferred embodiment and the first preferred embodiment shown in FIG. 6A is that, in the nineteenth preferred embodiment shown in FIG. 13A and FIG. 13B, there is no corresponding X-axis coil below either the second or the third auxiliary driving magnet 218, in addition, there is an opening being formed on both the circuit board and the connecting plate at a location corresponding to a bottom end of the second or the third auxiliary driving magnet 218. Such that, the bottom end of the second or the third auxiliary driving magnet 218 can penetrate through the opening of both the circuit board and the connecting plate, so as to be closer to the position sensor 219 mounted on the external circuit for providing stronger magnetic field feedback. As a result, the sensitivity of magnetic field detection is increased, and more choices are considerable when selecting the position sensor 219.

Figure 16:
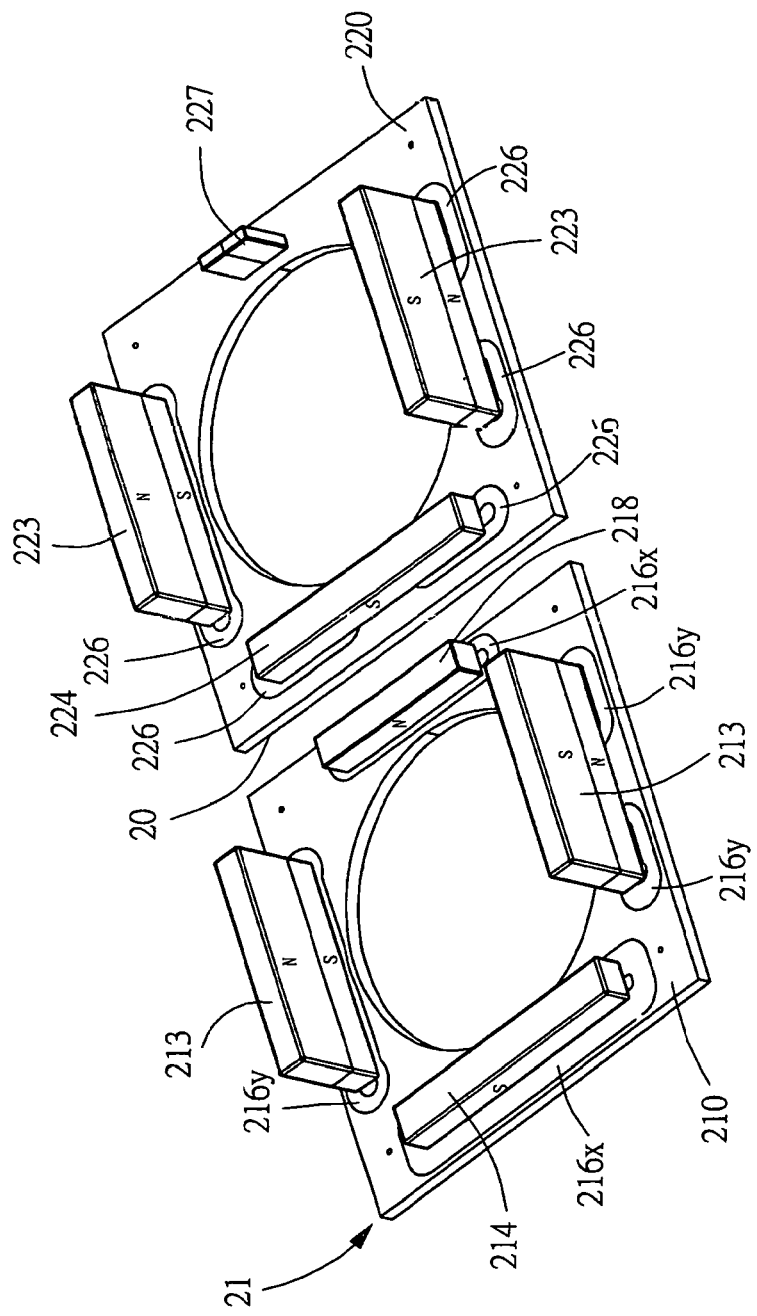
FIG. 16 is a schematic view of the twentieth preferred embodiment of the image capturing module having multiple lenses in accordance with the present invention.

FIG. 16 is a schematic view of the twentieth preferred embodiment of the image capturing module having multiple lenses in accordance with the present invention. Taking the first lens set 21 as an example, the difference between the twentieth preferred embodiment and the thirteenth preferred embodiment shown in FIG. 12E is that, in the twentieth preferred embodiment shown in FIG. 16, the volume of the second auxiliary driving magnet 218 adjacent to the adjacent surface 20 is smaller than the volume of the first auxiliary driving magnet 214 opposite to the second auxiliary driving magnet 218. In this twentieth preferred embodiment, the volume of second auxiliary driving magnet 218 is equal to or smaller than ⅔ of the volume of first auxiliary driving magnet 214. Such design not only can maintain a relative stronger horizontal magnetic driving forces along X-axis and Y-axis, but also can decrease the magnetic interference between the neighboring first and second lens modules.

Furthermore, as a trend to design a thinner and lighter smart phone, every small space inside the smart phone becomes more and more precious. In addition to the necessary components such like CPU, memory device, power module and etc., there is very little room for other components. The trend of full screen design further relatively shrinks the overall size of the contour of the smart phone. Moreover, the design of the front and rear cameras is also a tough challenge for planning the inner space of smart phone. Smart phone equipped with single lens module already cannot fulfill the needs of current market. More and more smart phones are equipped with dual lens module now a day. If these two lens modules are both equipped with OIS, then not only the space required inside the smart phone is increased, but also the magnetic interference between these two lens modules needs to be considered.

Thus, the fastest way to resolve the problem of the magnetic interference is to increase the distance between these two lens modules. Generally speaking, when the spacing between the outer cases of these two lens modules is greater than 3 mm, then the strength of the magnetic interference will be lowered to ⅕, but the space required for accommodating these two lens modules will increase 25%. Because the inner space of the smart phone is limited, it is another option to dismiss or shrink the size of the driving magnet which might cause serious magnetic interference, so as to decrease the magnetic interference without increasing the space required. In a conventional lens module with both OIS and voice coil motor (VCM) AF systems, driving magnets are usually shared by the OIS and AF systems. A shared driving magnet will be used to co-work with the driving coil of AF for providing the Z-axial driving force and also to co-work with the horizontal coil for providing one of the X-axial or Y-axial driving force. If anyone of the driving magnet is dismissed, the another corresponding driving magnet located opposite to the dismissed driving magnet will need to be thickened in order to compensate the horizontal driving force. The ratio between the thickness increased and the strength of magnetic field increased is not 1:1, not only the size of the lens module will be increased, but also the lens set will tilt due to the magnetic driving force occurred at single side. If try to shrink the size of the driving magnet, not only the magnetic interference can be reduced, but the horizontal driving force will also be reduced. The reduction of horizontal driving force means decreased efficiency and increased power consumption. Shrunk size and shape of driving magnet also cause tilts of the lens set due to uneven magnetic driving forces accompanying therewith. In contrary, enlarged driving magnet fulfills the needs of large magnetic driving force and sensitive closed-loop control, however, the magnetic interference will also increase accordingly, and thus is a dilemma.

Figure 17:
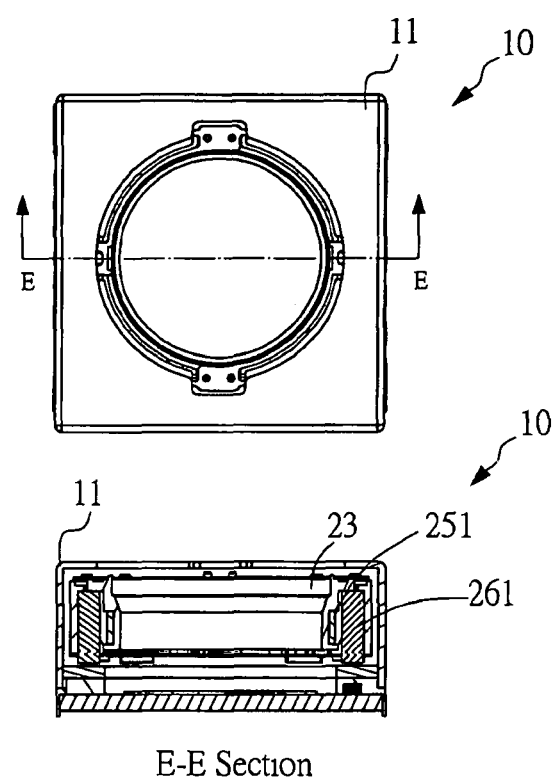
FIG. 17 shows the top view and C-C sectional view of the first lens set of the twenty-first preferred embodiment of the image capturing module having multiple lenses in accordance with the present invention.

Please refer to FIG. 17, which shows the top view and C-C sectional view of the first lens set of the twenty-first preferred embodiment of the image capturing module having multiple lenses in accordance with the present invention. As shown in FIG. 17, taking the first lens set 11 as an example, the driving magnet 261 co-work with the driving coil 215 to generate magnet driving forces for driving the lens set 23 to move axially along either the Z-axis, the Y-axis (or X-axis), or both. Generally speaking, in a VCM driving system for the movements along the X-axis, if the driving coil 215 is an annular monopole coil, then the position and height of the driving magnets 261 will cover the height of the entire driving coil 215, so as to allow the lens set to move along the Z-axis within the range of height of the driving magnet 261. The driving magnet 261 located adjacent to the adjacent surface is the biggest factor that influences the magnetic interference between two adjacent lens module with OIS system. The horizontal magnetic driving force generated by reactions between the driving magnet 261 and the horizontal coil thereunder also needs to be concerned. Therefore, it is necessary to carefully adjust the shape and size of the driving magnet 261 when designing an image capturing module with two OIS lens modules.

Please refer to FIG. 15 again, the embodiment of image capturing module designed by the inventors of the invention comprises a moving coil closed loop auto-focusing driving module, which has a magnetic interference avoiding structure that includes primary and auxiliary driving magnets 352a,352b,362 located at three sides of the lens module 31, while the other side is a notch side without any driving magnet. When assembling two such lens modules 31 to form a dual-lenses image capturing module, and having the notch side of both lens modules 31 to face toward the neighboring surface of these two lens modules 31, then an excellent design of magnetic interference avoiding structure can be obtained, while the sensitivity measured is 0.3 (μm/mA).

Please refer to FIG. 12E again, the smaller second auxiliary driving magnet 218 is located at a middle point of the notch side adjacent to the adjacent surface 20 opposite to the larger first auxiliary driving magnet 214. The height of the first and second auxiliary driving magnets 214,218 are both lower than the lower edge of the driving coil 15 (not shown in this figure). The configuration of the second lens module 22 is in the same direction as the first lens module. The second auxiliary driving magnet 218 located near to the adjacent surface 20 of the first lens module 21 not only can provide the magnetic interference avoiding function, but also can increase the horizontal magnetic driving force. It is measured that the horizontal magnetic driving force is increased 1.6 times to 0.48 (μm/mA) of sensitivity. When the spacing between the outer cases of two neighboring lens modules is 1.0 mm, the offset value of the optical axis is only 17 μm.

Therefore, based on the same configurations of the two neighboring lens modules 21,22 shown in FIG. 12E, in order to increase the horizontal magnetic driving force, the length of the second auxiliary driving magnet 218 nearby the adjacent surface 20 is increased to be ⅔ of the length of the first auxiliary driving magnet 214. As a result, the horizontal magnetic driving force is increased 1.4 times and the sensitivity is raised to 0.68 (μm/mA). However, because the length of second auxiliary driving magnet 218 is increased, thus the magnetic interference between these two lens module 21,22 must be increased as well. Therefore, the configuration of the second lens module 22 can take advantages from the design of the first lens module of the first preferred embodiment shown in FIG. 6A, wherein the notch side-nearby the adjacent surface of the first lens module is furnished with the smaller (shorter) second and third auxiliary driving magnets 218.

The second and third auxiliary driving magnets 218 nearby the adjacent surface 20 are spaced apart from each other. In order to increase the horizontal magnetic driving force, the second and third auxiliary driving magnets 218 should be designed higher. The positions, lengths, heights and sizes of the second and third auxiliary driving magnets 218 nearby the adjacent surface 20 are different from which of the first auxiliary driving magnet 214. Because the heights of the second and third auxiliary driving magnets 218 are increased, the second and third auxiliary driving magnets 218 will co-work with the driving coil 215 and generate Z-axial magnetic driving force pushing one side of the lens set 23 to move along the Z-axis. Because such driving force along Z-axis is unbalanced, the lens set 23 will tilt, generating a dynamic tilting angle when the lens set is moving along the Z-axis; The driving magnets of the first preferred embodiment shown in FIG. 6A are with the same height. The first auxiliary driving magnet 214 and the second and third auxiliary driving magnets 218 are positioned along the X-axis for testing (e.g., the first auxiliary driving magnet 214 is positioned at the −X direction, while the second and third auxiliary driving magnets 218 are positioned at the +X direction).

Figure 18:
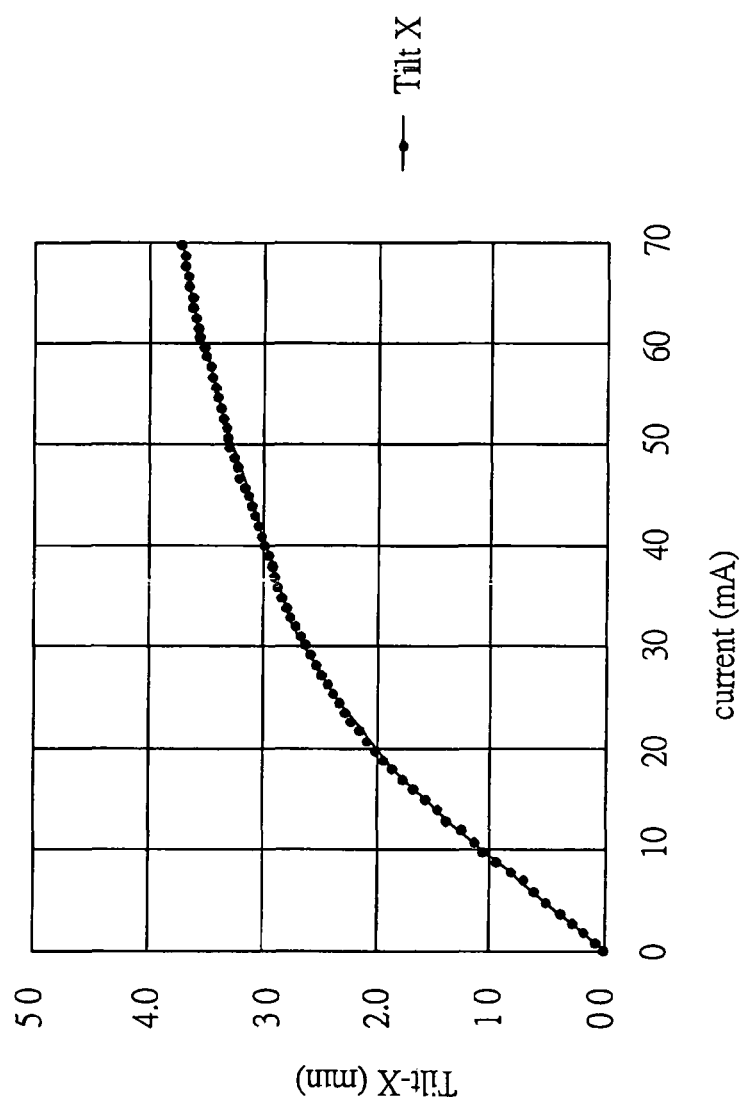
FIG. 18 is a diagram showing a test result of dynamic tilting of the lens set of the image capturing module of the twenty-first preferred embodiment shown in FIG. 17.

Please refer to FIG. 18, which is a diagram showing a test result of dynamic tilting of the lens set of the image capturing module of the twenty-first preferred embodiment shown in FIG. 17. When applying a predetermined current to the driving circuit to drive the lens set to move upward along Z-axis from an initial position, the tilt value of the lens set along the X-axis is measured. When the applied current is increased, which means the lens set is moved to a higher position, then another tilt value according to the increased current is measured, so as to plot the diagram of FIG. 18. It can be seen that, when the applied current is 70 mA, the measured tilt value of the lens set along the X-axis is +3.84 (min), which means the stronger magnetic driving force is generated at the side of the first auxiliary driving magnet 214, and the lens set moving along the Z-axis will tilt toward the notch side where the second and third auxiliary driving magnet 218 are located.

It can be understood from the above discussions that, there are many difficulties when designing and making an image capturing module with dual lens modules both having an OIS system. The manufacturers might only employ one single OIS system in the image capturing module with dual lens modules, or both lens modules are without OIS system. When using a conventional image capturing module with dual lens modules to take pictures, a picture is captured by using large aperture and then the focused area and blurred depth of field is processed. The major problem of such blurry cutout algorithm is that, the contour of the objects cannot be identified precisely. The picture combining speed is very slow when the pictures are captured under low luminance, and therefore require a stand to support the camera or the smart phone to take pictures in a steady condition. Without the stand, it is almost impossible for a user to hold a smart phone to take pictures under low luminance without shakings, and thus it is inevitable to obtain a blurry or even deformed picture. Such result is not what the customer desires or expects. Therefore, it is the effort that every manufacturer is dedicating in to design an image capturing module having dual lens module both with an OIS system, which also has the advantages of the best space saving configuration, minimized size of module, and improved imaging quality.

Figure 19:
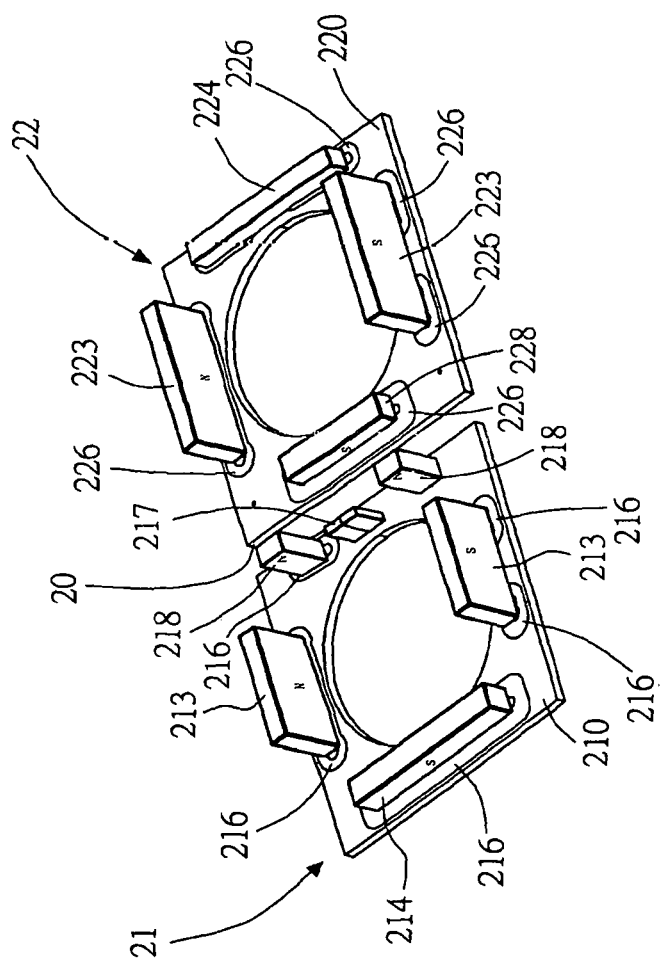
FIG. 19, which is a schematic view of the twenty-second preferred embodiment of the image capturing module having multiple lenses in accordance with the present invention.

Please refer to FIG. 19, which is a schematic view of the twenty-second preferred embodiment of the image capturing module having multiple lenses in accordance with the present invention. Wherein, the first lens module 21 and the second lens module 21 are both equipped with an OIS system. The heights of the second auxiliary driving magnets 218 are at least higher than a bottom edge of the unipolar annular driving coil 215 (please refer to FIG. 20) of the first lens module 21, in addition, the height of the second auxiliary driving magnet 228 is also at least higher than a bottom edge of the unipolar annular driving coil 225 (please refer to FIG. 20) of the second lens module 22. The second auxiliary driving magnets 218 of first lens module 21 and the second auxiliary driving magnet 228 of second lens module 22 are respectively located at two notch sides adjacent to the adjacent surface 20. The difference between the twenty-second preferred embodiment and the first preferred embodiment shown in FIG. 6A is that, in the twenty-second preferred embodiment shown in FIG. 19, not only the smaller second auxiliary driving magnets 218, 228 of the first and second lens modules 21, 22 are located at the notch sides nearby the adjacent surface 20 for avoiding magnetic interference, but also the heights of the smaller second auxiliary driving magnets 218, 228 are specially designed to be higher than the heights of their corresponding first auxiliary driving magnets 214, 224, so as to provide sufficient horizontal magnetic driving force and to balance the dynamic tilting of the lens set.

In this twenty-second preferred embodiment, the image capturing module having multiple lenses includes the first lens module 21 and the second lens module 22. The first lens module 21 is equipped with the smaller second and third auxiliary driving magnets 218 at the notch side nearby the adjacent surface 20. The second and third auxiliary driving magnets 218 both have a length shorter than the length of the larger first auxiliary driving magnet 214, but have a height higher than that of the first auxiliary driving magnet 214. The second and third auxiliary driving magnets 218 are spaced apart from each other along the Y-axis. The heights of the primary driving magnets 213 are higher than the heights of the first, second and third auxiliary driving magnets 214,218, however, the lengths of the primary driving magnets 213 are longer than the lengths of the second and third auxiliary driving magnets 218 but are shorter than the length of the first auxiliary driving magnet 214.

In the other hand, the second lens module 22 is equipped with the smaller second auxiliary driving magnet 228 at the notch side nearby the adjacent surface 20. The second auxiliary driving magnets 228 has a length shorter than the length of the larger first auxiliary driving magnet 224, but have a height higher than that of the first auxiliary driving magnet 224. The heights of the primary driving magnets 223 are higher than the heights of the first and second auxiliary driving magnets 224,228, in addition, the lengths of the primary driving magnets 223 are longer than the lengths of the second auxiliary driving magnets 228 but are about the same as the length of the first auxiliary driving magnet 224. The second auxiliary driving magnets 228 of the second lens module 22 is located at middle of the spaced apart second and third auxiliary driving magnets 218 of the first lens module 21 along the Y-axis. Which means, the second and third auxiliary driving magnets 218 of the first lens module 21 and the second auxiliary driving magnets 228 of the second lens module 22 are located at two sides of the adjacent surface 20 in a staggered order along the Y-axis. Moreover, the height of the second auxiliary driving magnets 228 of the second lens module 22 is lower than the heights of the second and third auxiliary driving magnets 218 of the first lens module 21. In this embodiment, the primary driving magnets 213, 223 of the first and second lens modules 21, 22 are all unipolar magnets with radial magnetization direction. Because the smaller second (and third) auxiliary driving magnets 218, 228 of the first and second lens modules 21, 22 are all located at the notch side nearby the adjacent surface 20, therefore the magnetic interference between the first and second lens modules 21, 22 is minimized. In addition, because the heights of the smaller second (and third) auxiliary driving magnets 218, 228 are relatively higher than which of their corresponding larger first auxiliary driving magnets 214, 224, the magnetic driving forces generated by the second (and third) auxiliary driving magnets 218, 228 will be similar to which generated by the first auxiliary driving magnets 214, 224, and thus the dynamic tilting of the lens set of the first and second lens modules 21, 22 can also be avoided.

Figure 20:
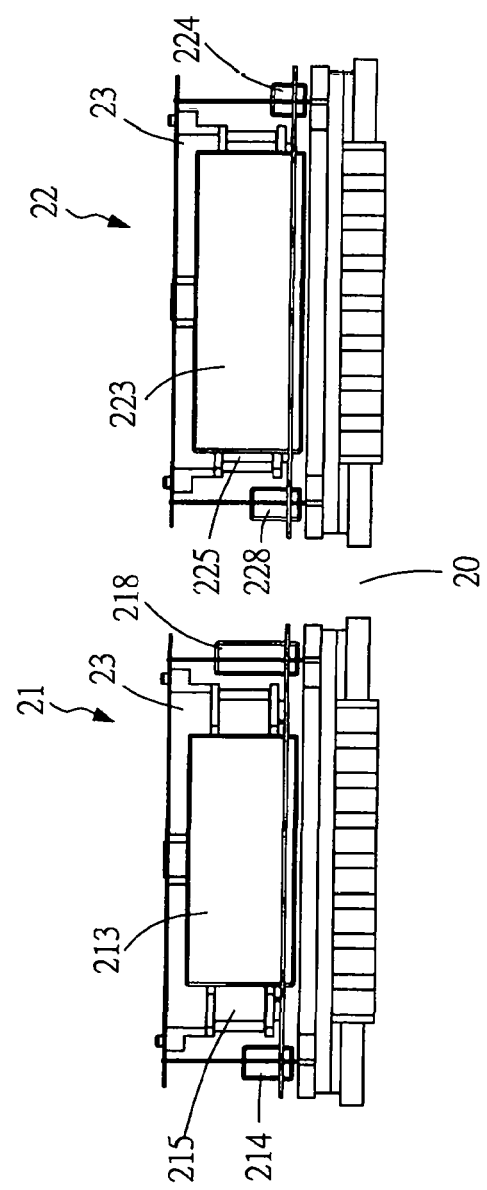
FIG. 20 is a first schematic front view of the configuration of driving magnets of the image capturing module of twenty-second preferred embodiment shown in FIG. 19.

FIG. 20 is a first schematic front view of the configuration of driving magnets of the image capturing module of twenty-second preferred embodiment shown in FIG. 19. Wherein, the length of the primary driving magnets 213 of the first lens module 21 is different from and shorter than the length of the primary driving magnets 223 of the second lens module 22. The primary driving magnets 213 of the first lens module 21 is unipolar magnet with radial magnetization direction. The primary driving magnets 213, the first auxiliary driving magnet 214 and the second and third auxiliary driving magnets 218 of the first lens set 21 are all having their N-pole facing toward the lens set.

The second lens set 22 has one smaller second auxiliary driving magnet 228 for avoiding magnetic interference located at the notch side nearby the adjacent surface 20. The second auxiliary driving magnet 228 is located opposite to the larger first auxiliary driving magnet 224 and has a length shorter than ⅔ of the length of the first auxiliary driving magnet 224. The heights of the first auxiliary driving magnet 224 and the second auxiliary driving magnet 228 are at least higher than the bottom edge of the annular driving coil 225. Increased height of the second auxiliary driving magnet 228 can increase the X-axial magnetic driving force at the side nearby the adjacent surface 20. In addition, because the upper end of the second auxiliary driving magnet 228 is higher than the bottom edge of the driving coil 225, therefore the upper end of the second auxiliary driving magnet 228 can co-work with the driving coil 225 for generating magnetic driving force along the Z-axis. In order to produce a balanced magnetic driving force at two sides along the X-axis of the second lens set 22, the height of the longer first auxiliary driving magnet 224 is also higher than the bottom edge of the driving coil 225, in addition, the height of the shorter second auxiliary driving magnet 228 is higher than which of the longer first auxiliary driving magnet 224.

The second lens set 21 has at least one smaller auxiliary driving magnet at the notch side nearby the adjacent surface 20, which includes the second auxiliary driving magnet 218 for avoiding magnetic interference and the third auxiliary driving magnet 218 for avoiding magnetic interference. The second and third auxiliary driving magnets 218 are located opposite to the larger first auxiliary driving magnet 214 and each has a length shorter than ⅓ of the length of the first auxiliary driving magnet 214. The heights of the first auxiliary driving magnet 214 and the second and third auxiliary driving magnets 218 are at least higher than the bottom edge of the annular driving coil 215. Increased height of the second and third auxiliary driving magnet 218 can increase the X-axial magnetic driving force at the side nearby the adjacent surface 20. In addition, because the upper ends of the second and third auxiliary driving magnet 218 are higher than the bottom edge of the driving coil 215, therefore the upper ends of the second and third auxiliary driving magnet 218 can co-work with the driving coil 215 for generating magnetic driving force along the Z-axis. In order to produce a balanced magnetic driving force at two sides along the X-axis of the first lens set 21, the height of the longer first auxiliary driving magnet 214 is also higher than the bottom edge of the driving coil 215, in addition, the heights of the shorter second and third auxiliary driving magnets 218 are higher than which of the longer first auxiliary driving magnet 214.

The heights of the primary driving magnets 213, 223 of the first and second lens modules 21, 22 are higher than the first and second (and third) auxiliary driving magnets 214, 224, 218, 228 of the first and second lens modules 21, 22 respectively.

Figure 21:
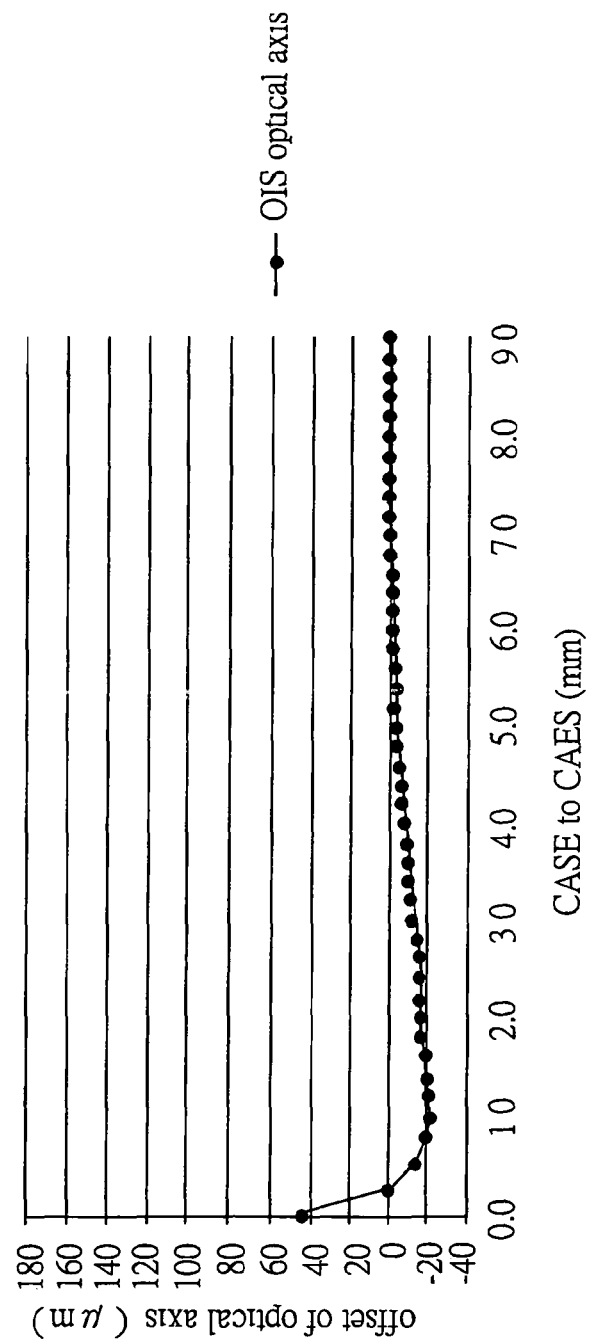
FIG. 21 is a diagram showing a test result of the offset of optical axis influenced by the magnetic interference caused by the driving magnets of the dual lens modules of the image capturing module of the twenty-second embodiment of the present invention shown in FIG. 19.

FIG. 21 is a diagram showing a test result of the offset of optical axis influenced by the magnetic interference caused by the driving magnets of the dual lens modules of the image capturing module of the twenty-second embodiment of the present invention shown in FIG. 19. It can be seen from FIG. 21 that, according to the concept of summed magnetic fields, the offset value of the optical axis is as low as 22 μm even when the spacing between the outer cases of the first and second lens modules 21,22 is 1 mm, it is due to the configuration that, one side of the adjacent-surface 20 is furnished with the shorter second and third auxiliary driving magnets 218 of first lens module 21, while the other side of the adjacent surface 20 is furnished with the shorter second auxiliary driving magnet 228 of first lens module 22, and these auxiliary driving magnets 218, 228 are arranged in a staggered order.

Based on the configuration of the image capturing module having multiple lenses of the twenty-second preferred embodiment of the present invention, it is measured that the X-axial horizontal magnetic driving force of the first lens module 21 is increased to 0.86 (μm/mA) of sensitivity, while the X-axial horizontal magnetic driving force of the second lens module 21 is also increased to 0.76 (mm/mA) of sensitivity. When the spacing between the outer cases of two neighboring lens modules is 1.0 mm, the offset value of the optical axis is only 17 m. The magnetic interference is also decreased by the design of different heights of the first and second (and third) auxiliary driving magnets of the lens modules 21,22.

Figure 22:
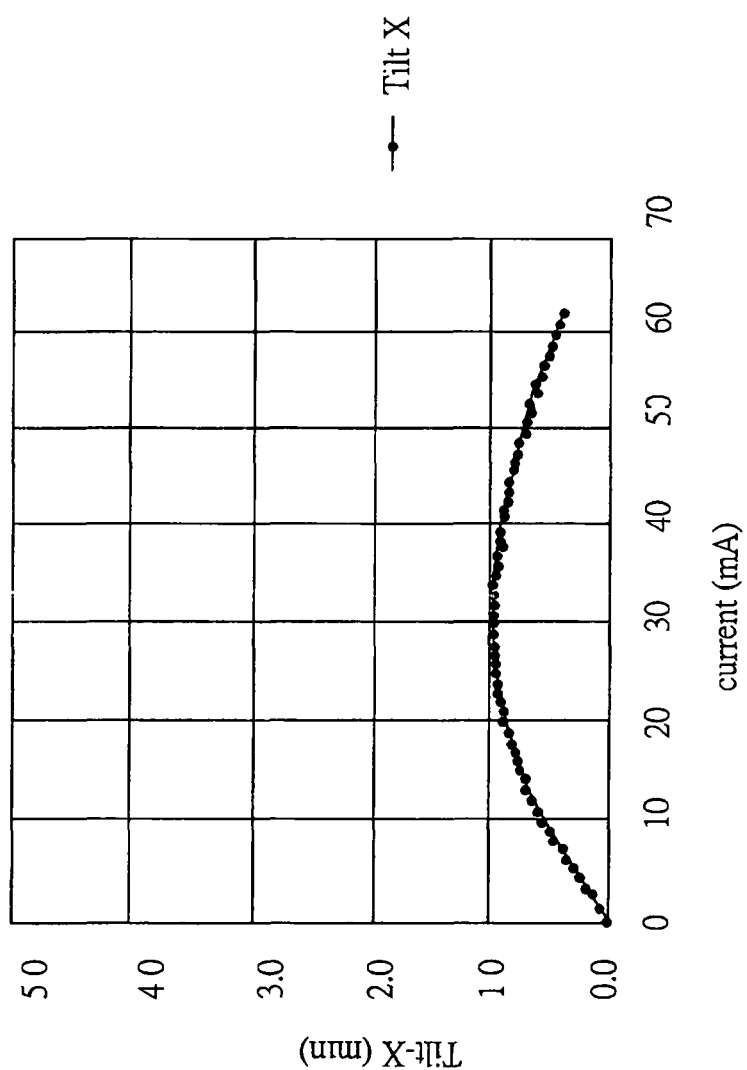
FIG. 22 is a diagram showing a test result of dynamic tilting of the lens set of the image capturing module of the twenty-second preferred embodiment shown in FIG. 19.

Moreover, the first, second and third auxiliary driving magnets 214, 218 of the first lens module 21 are designed to have their upper end higher than the bottom edge of the annular driving coil 215 so as to co-work with the annular driving coil 215 for generating Z-axial magnetic driving forces to adjust the dynamic tilting of the lens set. Please refer to FIG. 22, which is a diagram showing a test result of dynamic tilting of the lens set of the image capturing module of the twenty-second preferred embodiment shown in FIG. 19. When applying a predetermined current to the driving circuit to drive the lens set to move upward along Z-axis from an initial position, the tilt value of the lens set along the X-axis is measured. It can be seen that, the maximum measured tilt value of the lens set along the X-axis is 0.92 (min), which means the dynamic tilting of the lens set has been significantly improved by the configuration of the different heights of the first and second (and third) auxiliary driving magnets 214, 218. By allowing the heights of the second and third auxiliary driving magnets 218 nearby the adjacent surface 20 to be higher than the first auxiliary driving magnets 214, the dynamic tilting of the lens set can be significantly improved.

Figure 23:
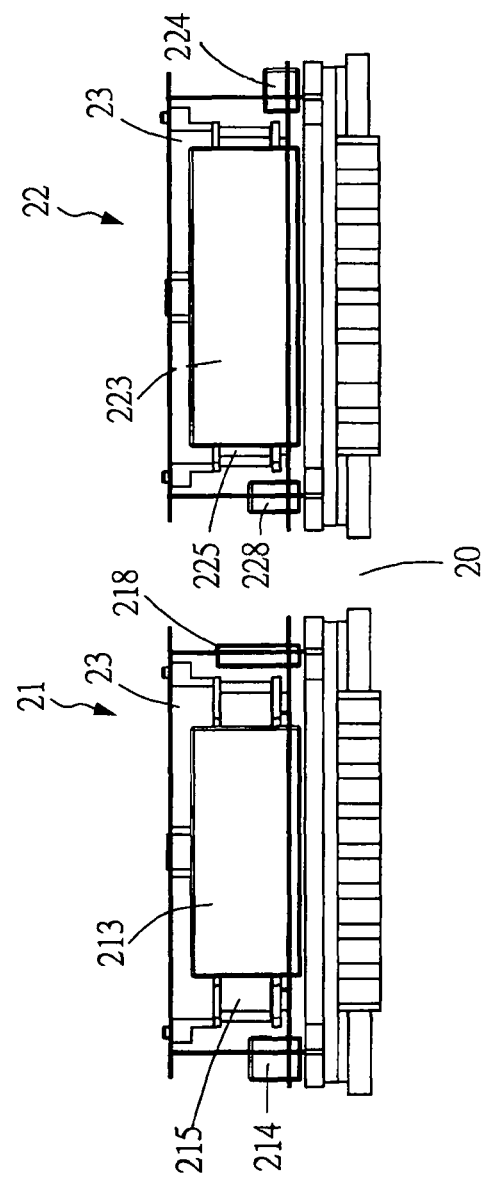
FIG. 23 is a second schematic front view of the configuration of driving magnets of the image capturing module of twenty-second preferred embodiment shown in FIG. 19.

FIG. 23 is a second schematic front view of the configuration of driving magnets of the image capturing module of twenty-second preferred-embodiment shown in FIG. 19. Wherein, the length of the primary driving magnets 213 of the first lens module 21 is different from and shorter than the length of the primary driving magnets 223 of the second lens module 22. The magnetic interference can be decreased either by the configuration of the driving magnets or by adjusting the spacing between these driving magnets 223. The heights of the second auxiliary driving magnets 218, 228 located nearby the adjacent surface 20 are respectively higher than the heights of the first auxiliary driving magnets 214, 224 of the first and second lens modules 21, 22, while the heights of the primary driving magnets 213, 223 are even higher than the heights of the second auxiliary driving magnets 218, 228. The horizontal magnetic driving force, the dynamic tilting of lens set, and the magnetic interference can be optimized and balanced by either adjusting the heights or thickness of these driving magnets.

Figure 24:
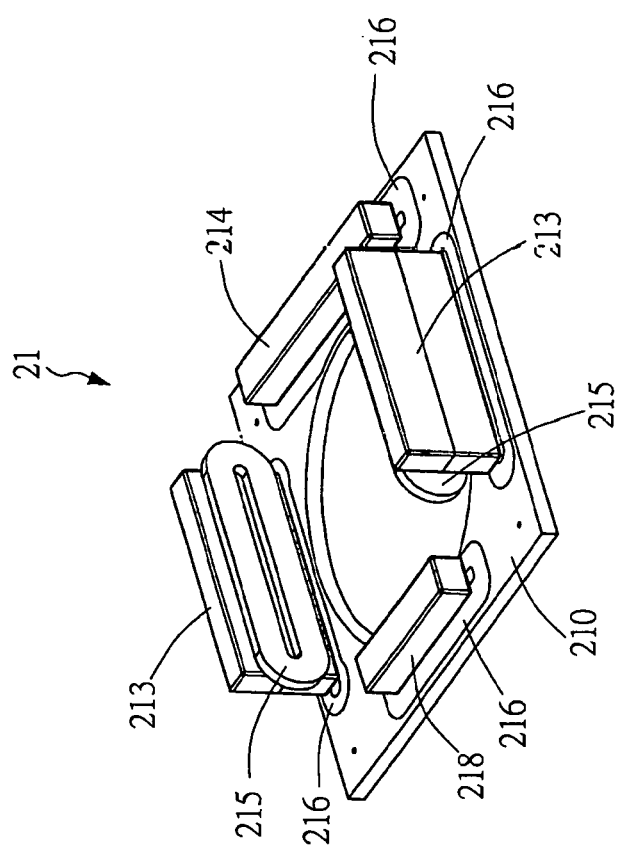
FIG. 24 is a schematic view of the twenty-third preferred embodiment of the image capturing module having multiple lenses in accordance with the present invention.

Please refer to FIG. 24, which is a schematic view of the twenty-third preferred embodiment of the image capturing module having multiple lenses in accordance with the present invention. Taking the first lens module 21 as an example for description, in addition to the aforementioned annular unipolar driving coil, the driving coil 215 thereof can also be either an annular bipolar driving coil, a flat bipolar coil or a coil printed on a PCB, which can co-work with the primary driving magnets 213 for providing magnetic driving force to move the lens set (not shown in this figure) along the Z-axis.

While the present invention has been particularly shown and described with reference to a preferred embodiment, it will be understood by those skilled in the art that various changes in form and detail may be without departing from the spirit and scope of the present invention.

What is claimed is:

1. An image capturing module having multiple lenses comprising at least a first lens module and a second lens module neighboring the first lens module; the first lens module and the second lens module each being defined by an X-axis, a Y-axis and a Z-axis that are perpendicular to each other; the first lens module and the second lens module each having an optical axis parallel to the Z-axis; the first lens module and the second lens module each comprising:
   a frame, having an inner compartment therein;
   a lens set, located in the compartment of the frame in a moveable manner; and
   a first driving system, further comprising: a driving coil and at least two primary driving magnets opposite to each other; wherein the driving coil is furnished on outer peripheral of the lens set and is corresponding to the at least two primary driving magnets inside the frame for providing a magnetic driving force to drive the lens set to move along the optical axis;
   wherein, at least one of the first lens module and the second lens module further comprises a second driving system; said second driving system comprises: a circuit board, at least two horizontal coils and at least two auxiliary driving magnets; said at least two auxiliary driving magnets are located on the frame; said at least two horizontal coils are furnished on the circuit board and corresponding to said primary driving magnets and said at least two auxiliary driving magnets for providing another magnetic driving force to drive the frame to move along the X-axis and the Y-axis;
   wherein, the first lens module and the second lens module are adjacent to each other and have an adjacent surface located therebetween, in addition, the primary driving magnets of the first lens module and the second lens module are not located at the side adjacent to the adjacent surface at the same time;
   wherein, each of said auxiliary driving magnets has a volume smaller than the volume of each of said primary driving magnets;
   wherein, the at least two auxiliary driving magnets further comprises: a relatively larger first auxiliary driving magnet and a relative smaller second auxiliary driving magnet; the second auxiliary driving magnet is located nearby the adjacent surface, and the volume of the second auxiliary driving magnet is smaller than or equal to $2/3$ of the volume of the first auxiliary driving magnet; the volume of the first auxiliary driving magnet is smaller than the volume of each of the primary driving magnets.

2. The image capturing module having multiple lenses of claim 1, wherein:
   the first lens module and the second lens module each further comprises at least one elastic element for connecting with the frame, said at least one elastic element supports and retains the lens set in a manner movable along the optical axis inside the compartment;
   at least one of the first lens module and the second lens module further comprises a plurality of suspension wires for supporting and suspending the frame together with the lens set and the at least one elastic element above the circuit board;
   the first lens module and the second lens module each further comprises a top cover, the top cover has a hole; in addition, the lens set further comprises: lenses and a lens support; wherein the lenses are mounted in and moveable together with the lens support;
   wherein, the image capturing module having multiple lenses further comprises:
   an external circuit, located below the frame and electrically connected with the circuit board; said external circuit being mounted with an image sensor and at least one position sensor; and
   at least one sensing magnet, mounted at a side of outer surface of said lens set, and corresponding to one of said at least one position sensor.

3. The image capturing module having multiple lenses of claim 2, wherein at least one of the first lens module and the second lens module further has a notch side; here the term "notch side" means that, a top view of the first lens module (or the second lens module) has a square contour including four sides; in which, among these four sides, there is one of said four sides being equipped with no primary driving magnet nor relatively larger auxiliary driving magnet and being called as the notch side of the first lens module (or the second lens module).

4. The image capturing module having multiple lenses of claim 2, wherein said at least one elastic element includes an upper spring and a lower spring, which are respectively connected to a top end and a bottom end of the frame.

5. The image capturing module having multiple lenses of claim 2, wherein the circuit board is electrically connected with a connecting plate with a circuit layout, and is further electrically connected with the external circuit by means of a plurality of contact pins located on a side of the connecting plate; wherein, the image sensor is located at the optical axis and is capable of accepting an external image light coming from the lens set and the hole of top cover; wherein the external circuit is a circuit of one of the following: smart phone; tablet computer or notebook computer; wherein the position sensor is one of the following: Hall sensor, AMR, GMR or TMR; wherein the driving coil is one of the following: annular unipolar driving coil, annular bipolar driving coil, bipolar flat coil or a PCB; wherein the number of the suspension wires is four.

6. The image capturing module having multiple lenses of claim 2, wherein the sensing magnet is either a unipolar sensing magnet or a bipolar sensing magnet.

7. The image capturing module having multiple lenses of claim 2, wherein a magnetization direction of the sensing magnet is parallel to the optical axis, that is parallel to the Z-axis.

8. The image capturing module having multiple lenses of claim 3, wherein said at least two auxiliary driving magnets further comprises: a relative smaller third auxiliary driving magnet; wherein, the second auxiliary driving magnet and the third auxiliary driving magnet are located at the notch side adjacent to the adjacent surface, and the volume of the third auxiliary driving magnet is smaller than the volume of the first auxiliary driving magnet;
   wherein the second auxiliary driving magnet and the third auxiliary driving magnet both are a unipolar magnet or a bipolar magnet;
   wherein a magnetization direction of both the second auxiliary driving magnet and the third auxiliary driving magnet is one of the following: radial magnetization direction, circumferential magnetization direction, or the magnetization direction of the second auxiliary driving magnet is facing to the magnetization direction of the third auxiliary driving magnet.

9. The image capturing module having multiple lenses of claim 8, wherein the height of the first auxiliary driving magnet is lower than the heights of the second auxiliary driving magnet and the third auxiliary driving magnet located nearby the adjacent surface; in addition, the height of the first auxiliary driving magnet is also lower than the height of each of the primary driving magnets.

10. The image capturing module having multiple lenses of claim 9, wherein the heights of the second auxiliary driving magnet and the third auxiliary driving magnet are not higher than the height of each of the primary driving magnets.

11. The image capturing module having multiple lenses of claim 8, wherein the lengths of the second auxiliary driving magnet and the third auxiliary driving magnet are both not longer than ⅓ of the length of the first auxiliary driving magnet; in addition, the thicknesses of the second auxiliary driving magnet and the third auxiliary driving magnet are either the same with or different from the thickness of the first auxiliary driving magnet.

12. The image capturing module having multiple lenses of claim 8, wherein the height of the first auxiliary driving magnet is lower than at least one of the second auxiliary driving magnet or the third auxiliary driving magnet, in addition, the height of the first auxiliary driving magnet is lower than each of the primary driving magnets.

13. The image capturing module having multiple lenses of claim 1, wherein the first auxiliary driving magnet is either unipolar or bipolar magnet with either radial magnetization direction or axial magnetization direction, in addition, the polarity of the first auxiliary driving magnet is either the same with or different from the polarity of at least a lower part of each of the primary driving magnets.

14. The image capturing module having multiple lenses of claim 1, wherein the heights of each of the primary driving magnets and each of the auxiliary driving magnets are higher than a bottom edge of the driving coil along the Z-axis, such that the primary driving magnets and the auxiliary driving magnets can co-work with the driving coil for providing Z-axial magnetic driving forces; the heights of the primary driving magnets are different from the heights of the auxiliary driving magnets.

15. The image capturing module having multiple lenses of claim 1, wherein each of the primary driving magnets is a bipolar magnet with radial magnetization direction.

16. The image capturing module having multiple lenses of claim 1, wherein an upper part of each of the primary driving magnets co-works with the driving coil to provide magnetic driving forces along Z-axis; a lower part of each of the primary driving magnets co-works with one of the horizontal coils to provide magnetic driving forces along either X-axis or Y-axis.

17. The image capturing module having multiple lenses of claim 1, wherein a distance between a center point along the length of each of the primary driving magnets of the first lens module and a center point of the spacing between the first and second lens modules is either the same with or different from another distance between another center point along the length of each of the primary driving magnets of the second lens module and the center point of the spacing between the first and second lens modules.

18. The image capturing module having multiple lenses of claim 1, wherein the configuration of the primary and auxiliary driving magnets is either four corner-typed magnets located at four corners of the frame or four rectangular bar-typed magnets located at four sides of the frame.

19. The image capturing module having multiple lenses of claim 1, wherein each of the primary driving magnets is unipolar magnet with radial magnetization direction.

20. The image capturing module having multiple lenses of claim 1, wherein the length of each of the primary driving magnets of the first lens module is different from the length of each of the primary driving magnets of the second lens module.

* * * * *